April 24, 1945.   J. T. LANCASTER   2,374,359
FASTENING-INSERTING MACHINE
Filed Jan. 27, 1943   10 Sheets-Sheet 1

INVENTOR
John T. Lancaster
By his attorney

April 24, 1945. J. T. LANCASTER 2,374,359
FASTENING-INSERTING MACHINE
Filed Jan. 27, 1943 10 Sheets-Sheet 2

INVENTOR:
John T. Lancaster
By his attorney

April 24, 1945. J. T. LANCASTER 2,374,359
FASTENING-INSERTING MACHINE
Filed Jan. 27, 1943 10 Sheets-Sheet 3

INVENTOR:
John T. Lancaster
By his attorney

April 24, 1945. J. T. LANCASTER 2,374,359
FASTENING-INSERTING MACHINE
Filed Jan. 27, 1943 10 Sheets-Sheet 4
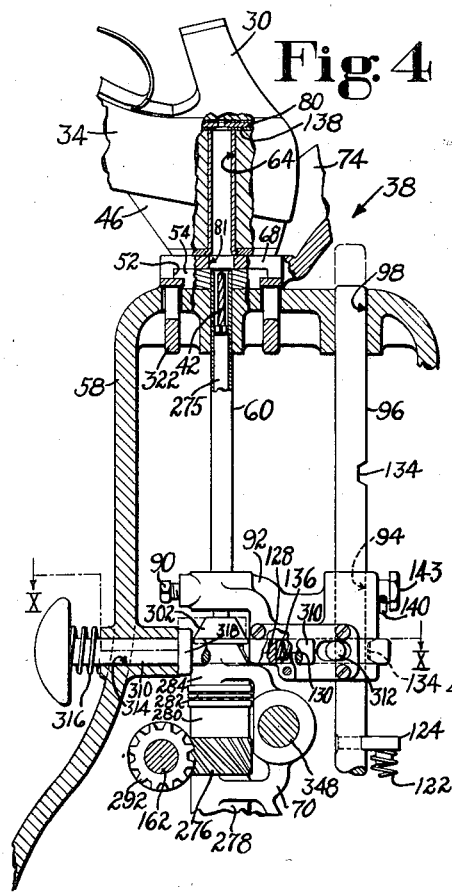
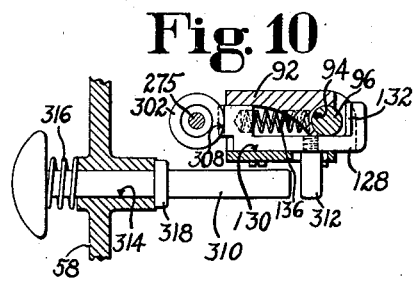
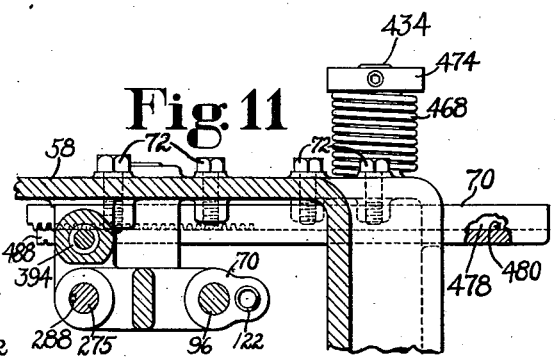
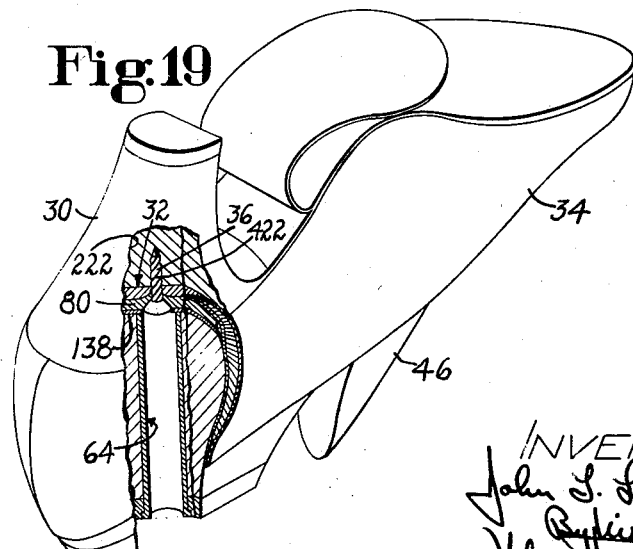

April 24, 1945.  J. T. LANCASTER  2,374,359
FASTENING-INSERTING MACHINE
Filed Jan. 27, 1943  10 Sheets-Sheet 5
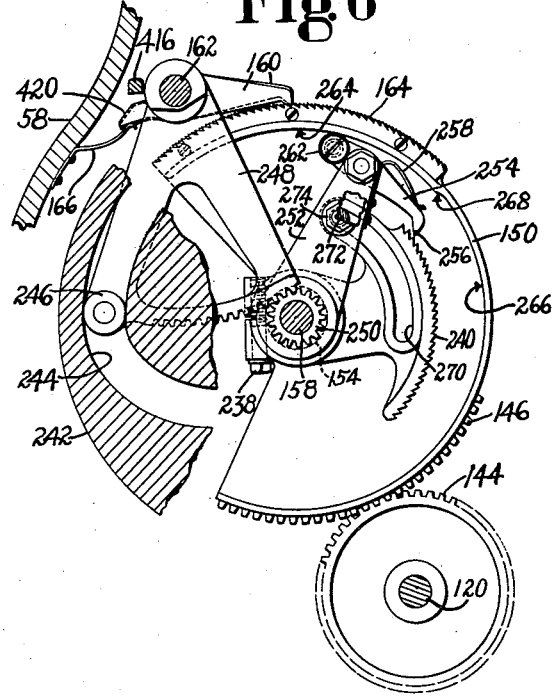
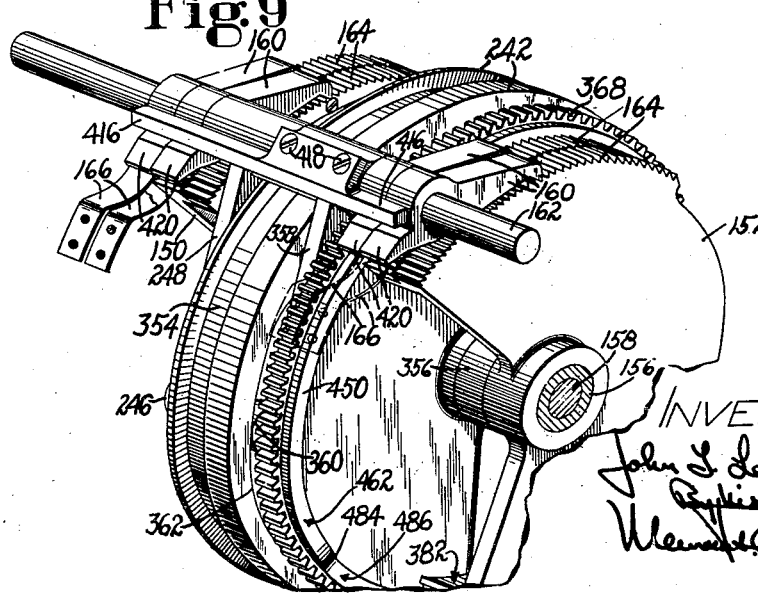

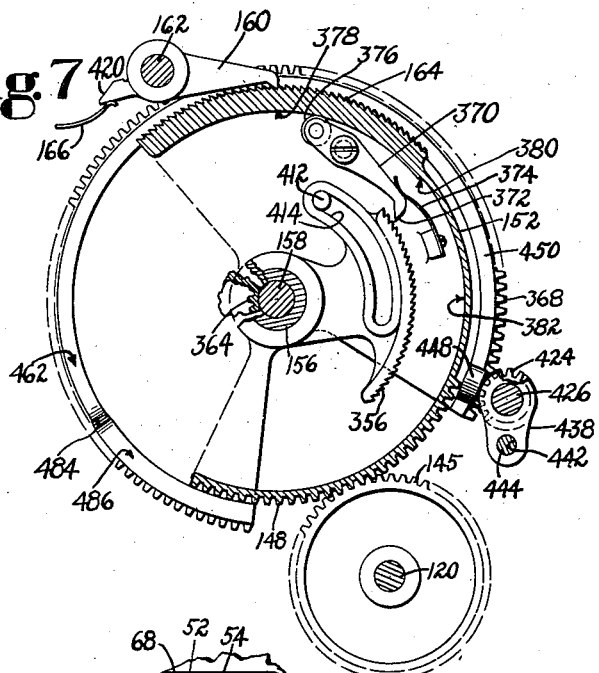
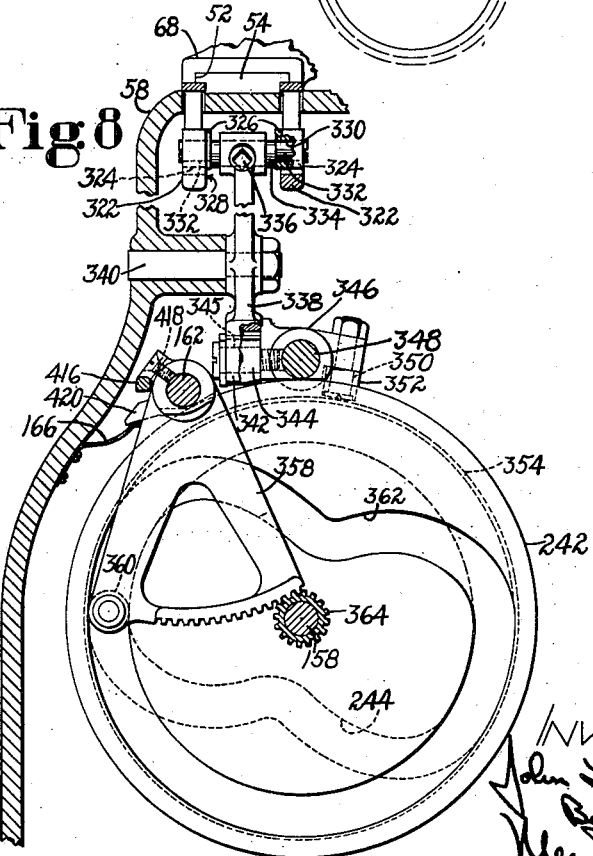

April 24, 1945.   J. T. LANCASTER   2,374,359
FASTENING-INSERTING MACHINE
Filed Jan. 27, 1943   10 Sheets-Sheet 7
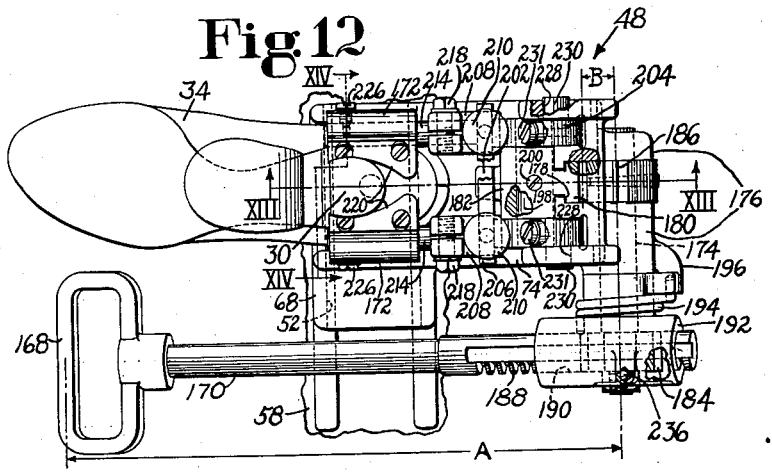
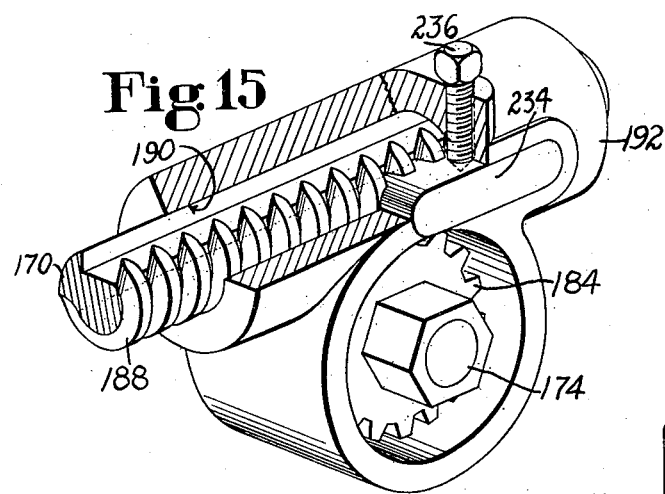
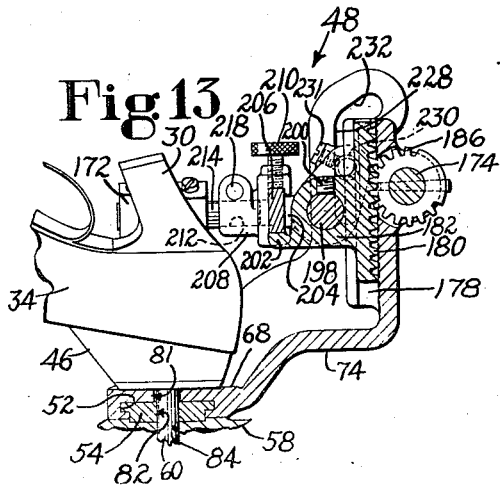

April 24, 1945.   J. T. LANCASTER   2,374,359
FASTENING-INSERTING MACHINE
Filed Jan. 27, 1943   10 Sheets-Sheet 8

INVENTOR

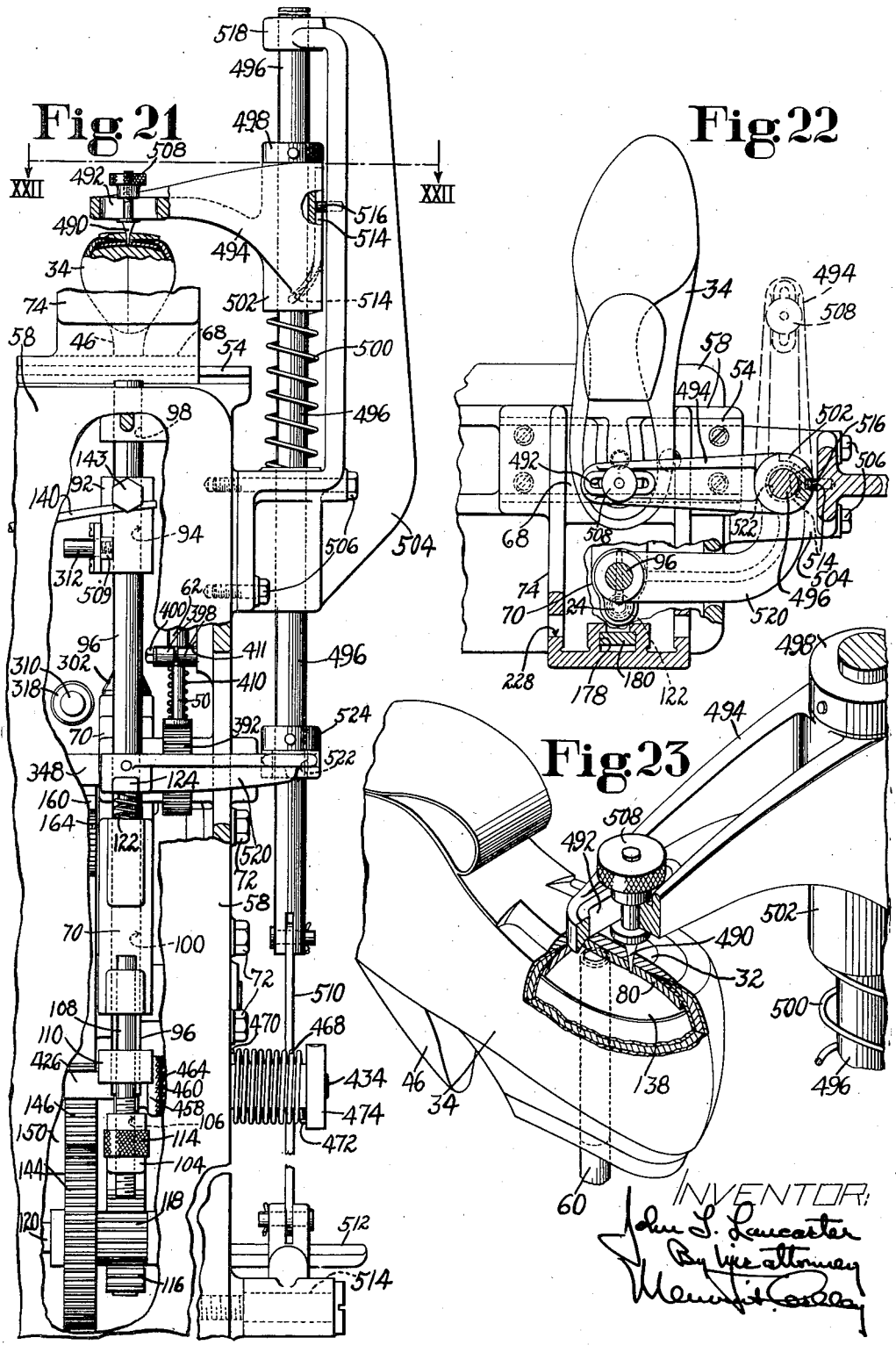

Patented Apr. 24, 1945

2,374,359

UNITED STATES PATENT OFFICE 2,374,359

FASTENING-INSERTING MACHINE

John T. Lancaster, Newton, Mass., assignor to United Shoe Machinery Corporation, Flemington, N. J., a corporation of New Jersey Application January 27, 1943, Serial No. 473,708

81 Claims. (Cl. 12—42)

This invention relates to fastening-inserting machines and is illustrated as embodied in a machine for attaching heels to shoes.

It is common practice to attach heels to shoes mounted upon lasts by the use of a machine comprising a drill, which operates through a passage in the cone of the last to form a hole extending through the heel seat of the shoe and into the heel, and a driver, which later operates through said passage and drives a permanent heel-attaching screw into the hole. The hole should have a depth slightly greater than the length of the screw which is used to attach the heel to the shoe and the head of which should be driven flush with the inner face of the heel end of the insole of the shoe.

The cones of lasts on which shoes are built differ in height in accordance with the various sizes and/or styles of the shoes, and in machines in which the drill and the screw driver have constant travels considerable difficulty has been experienced in getting the operator to exercise sufficient care to locate accurately the heel seats of the lasts, upon which the shoes are mounted, lengthwise of the path of travel of the drill and the screw driver in order to insure that, irrespective of the size and/or style of the shoe, the hole formed in the work shall be of uniform depth and the head of the driven screw shall be flush with the insole of the shoe. It is not objectionable if the head of the screw is driven slightly below the inside face of the insole and the term "flush" is intended to include such a condition. If the work is not accurately positioned in machines of the type just referred to, or if the drilling of the hole and the driving of the screw is left entirely to the "feel" of the operator, as in other machines now in use, it has been found that the hole is frequently too deep or not deep enough, or that the screw is driven too far or not far enough into the work. When the screw is driven too far into the work, an undesirable cavity is formed by the screw in the heel end of the insole, or the screw may be driven through the insole with the resultant loss in holding power of the screw and/or the breaking of the head of the screw under the force of the screw driver.

It is an object of the present invention to provide an improved machine which will quickly and effectively attach heels to shoes mounted on lasts and which has none of the above-mentioned drawbacks. With the above object in view and in accordance with a feature of the present invention, the illustrative machine comprises a support for a shoe mounted upon a last which has a passage extending through its cone, a feeler for measuring the work, one or more power-operative tools movable through the passage in the last for attaching a heel to the shoe, and means governed by the feeler for controlling the amount of movement of said one or more of the tools.

In the illustrative embodiment of the invention the tools comprise a drill and a screw driver to which the shoe, secured by a clamp upon the support, is moved into positions for successive operation by the tools, the support and the clamp being actuated automatically as a unit for this purpose. The feeler has the form of a cylindrical tube which, when the machine is at rest, is in a raised idle position above the support and serves as a last pin, the upper end of the tube being engaged by a heel plate of the last upon which the shoe is mounted, said plate having an opening slightly smaller than and registering with the cylindrical passage of the last. After the shoe on the last has been mounted upon the tube, it is depressed, together with the tube, until the crown of the last engages the support. The cone of the last is thus measured heightwise by the tube, which is operatively connected to a pair of masks the setting of which regulates the amount of upward travel of the drill and the screw driver by introducing variable amounts of lost motion into actuating strokes of operating mechanism for the drill and the screw driver in accordance with the measured heights of the lasts upon which the shoes are mounted. With such a construction the holes formed in the work by the drill are of a constant depth and the heel-attaching screws driven into the work have their heads driven flush with the inner faces of the insoles of the shoes irrespective of the heights of the lasts upon which the shoes are mounted and, accordingly, the positions of the heel seats of the shoes in the machine.

In accordance with another feature of the invention, there is provided a member, for example, a sleeve having a bore, said sleeve being movable together with the screw driver and being constructed and arranged to be stopped by the work and to have its bore serve as a guide for the head of the screw being driven. When the machine is idle and during a major portion of the operation of the machine, the sleeve is held yieldingly in a predetermined position upon the screw driver, in which position the upper end of the sleeve and the driver together form a recess into which the screw is dropped, head down. During the upward screw-inserting stroke of the driver, the sleeve and the driver move together as a unit through the passage in the last upon which the shoe is mounted until the sleeve engages the heel plate of the last. Continued upward movement of the driver causes the screw, the pointed end of which at this time is about to enter the previously formed hole in the heel seat of the shoe and the heel, to be driven into the work, the sleeve serving as a guide for the head of the screw being driven.

During its upward stroke, the illustrative screw driver, which is of the type adapted to operate on screws having Phillips heads, starts to rotate as the pointed end of the screw enters the hole formed in the work by the drill. Upward movement of the driver is continued until the head of the screw is driven flush with the inner face of the insole of the shoe, at which time the driver ceases temporarily to rotate and is then lowered and rotated back to its starting position. The upward axial advance of the screw caused by its rotation is approximately equal to the upward axial advance of the driver, thus insuring that the screw shall turn into the work without stripping the same.

The measuring tube and mechanism associated therewith, which forms part of inside last-measuring means, may be replaced by outside last-measuring means which is disclosed herein and comprises an awl movable through the heel seat of the shoe and into engagement with the outside face of the heel plate of the last. The outside last-measuring mechanism is operatively connected with the above-mentioned masks, the setting of which governs the length of the strokes of the drill and the screw driver in accordance with the heights of the cones of lasts upon which the shoes are mounted.

The above and various other features of the invention will be understood and appreciated from the following detailed description read in connection with the accompanying drawings, in which Fig. 1 is a side elevation of the illustrative machine, which is shown partly broken away and partly in section, on line I—I of Fig. 2;

Fig. 4 is a view corresponding to the upper portion of Fig. 3, showing the drilling and the last-measuring mechanism during a later stage in the operation of the machine;

Fig. 6 is a section on line VI—VI of Fig. 2, showing portions of the drill-operating mechanism;

Fig. 7 is a section on line VII—VII of Fig. 2, showing portions of the screw-driver-operating mechanism;

Fig. 8 is a section on line VIII—VIII of Fig. 2, showing portions of the screw-driver-operating mechanism and mechanism for moving the work support from one operative position to another;

Fig. 9 is an angular view, showing portions of the masks, operating cams, and mechansm for releasing the masks;

Figs. 10 and 11 are sections on lines X—X of Fig. 4 and XI—XI of Fig. 3, respectively;

Fig. 12 is a plan view of the clamp for securing work in a fixed position upon the support of the machine;

Figs. 13 and 14 are sections on lines XIII—XIII and XIV—XIV of Fig. 12;

Fig. 15 is a perspective view, partly in section, of portions of mechanism for operating the clamp;

Fig. 19 is an angular view, partly in section, of a shoe the heel of which has been attached by the use of the illustrative machine;

Figs. 20 and 21 are side and rear elevations, respectively, partly broken away and partly in section, of the above machine equipped with modified last-measuring mechanism;

Fig. 22 is a section on line XXII—XXII of Fig. 21; and

Fig. 23 is an enlarged angular view, showing a work-engaging portion of said modified last-measuring mechanism.

Figure 1:
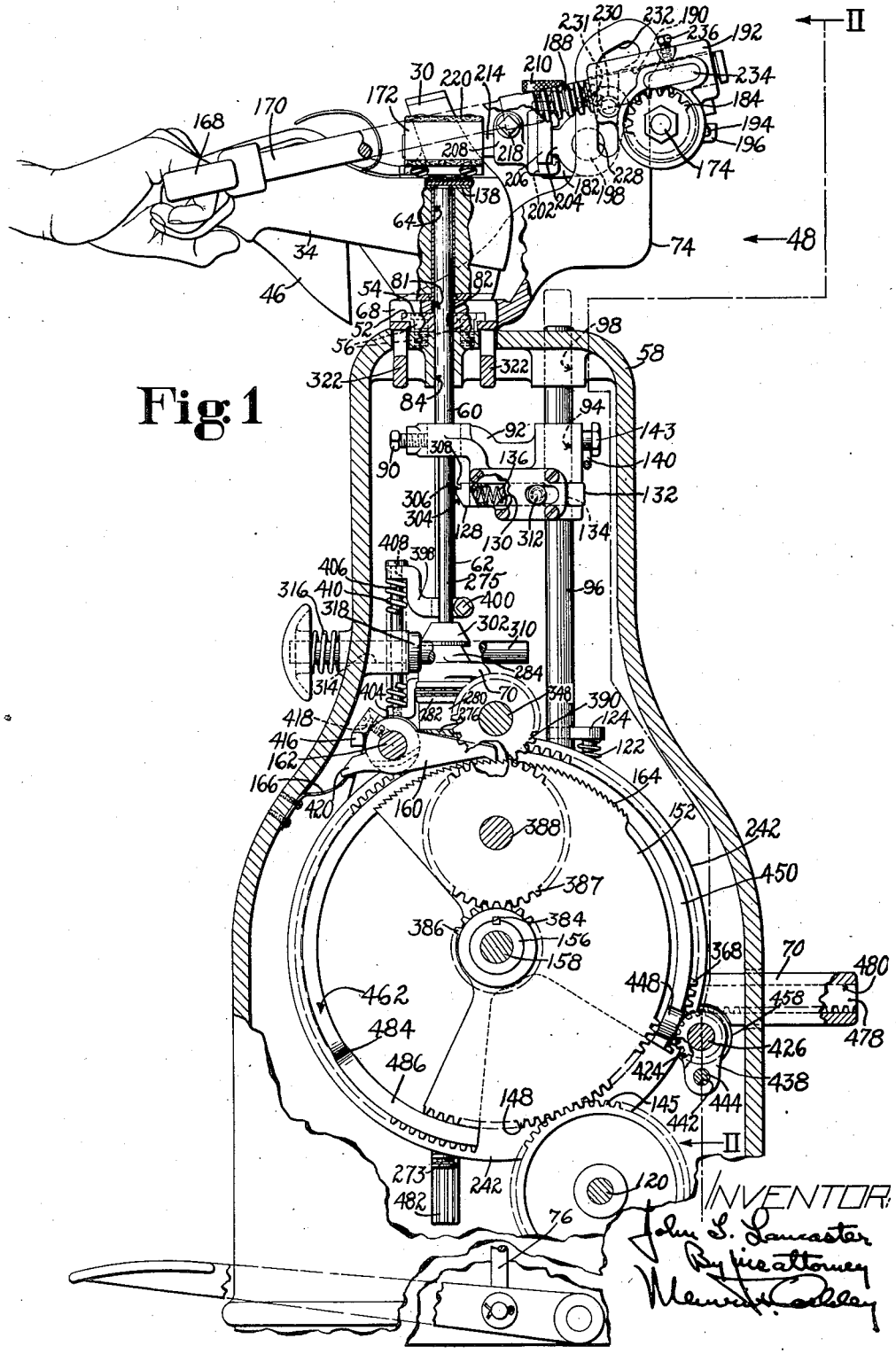
Figure 2:
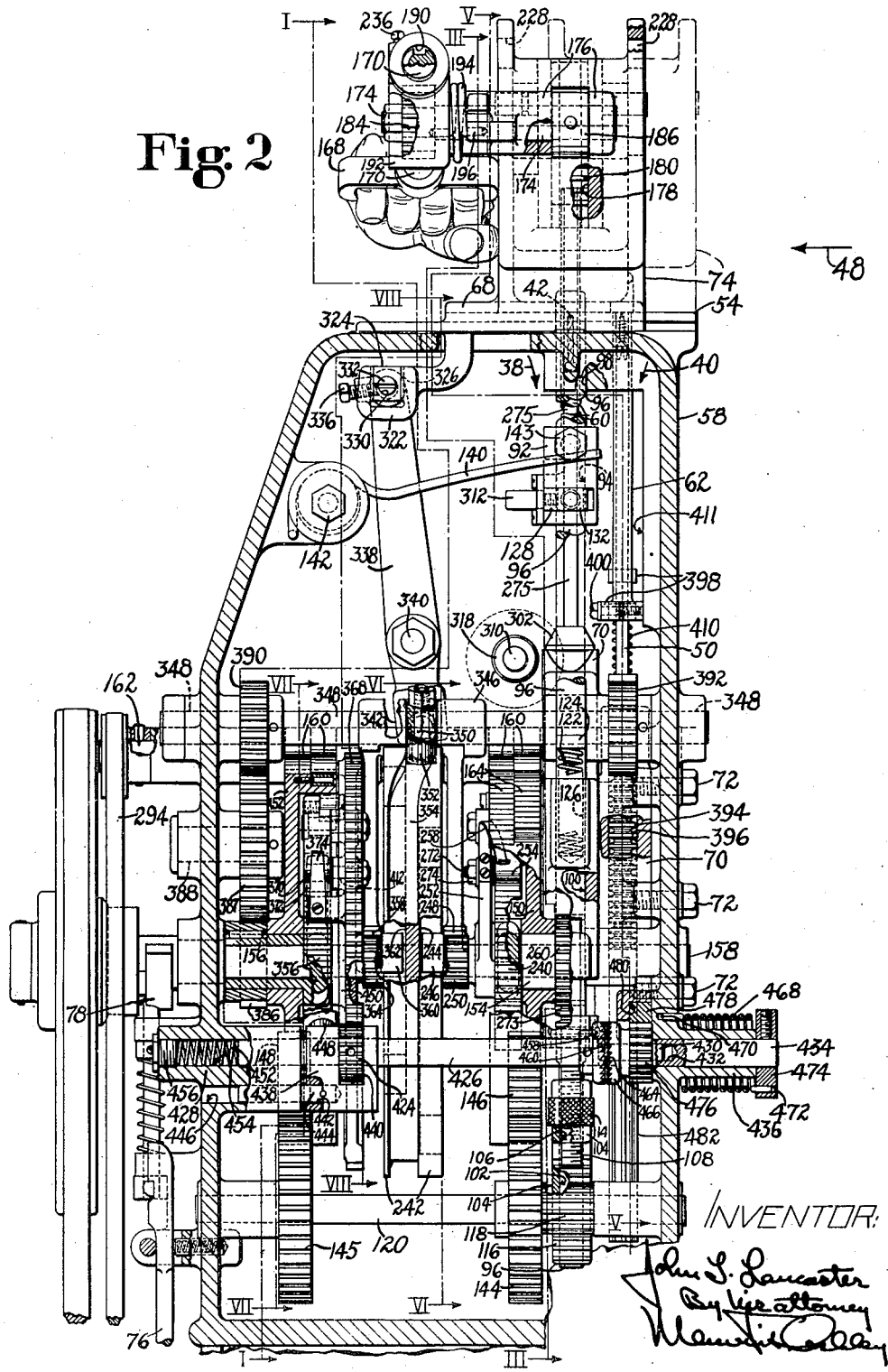
Fig. 2 is a rear view of the machine, partly in section, on line II—II of Fig. 1, with portions broken away.
Figure 16:
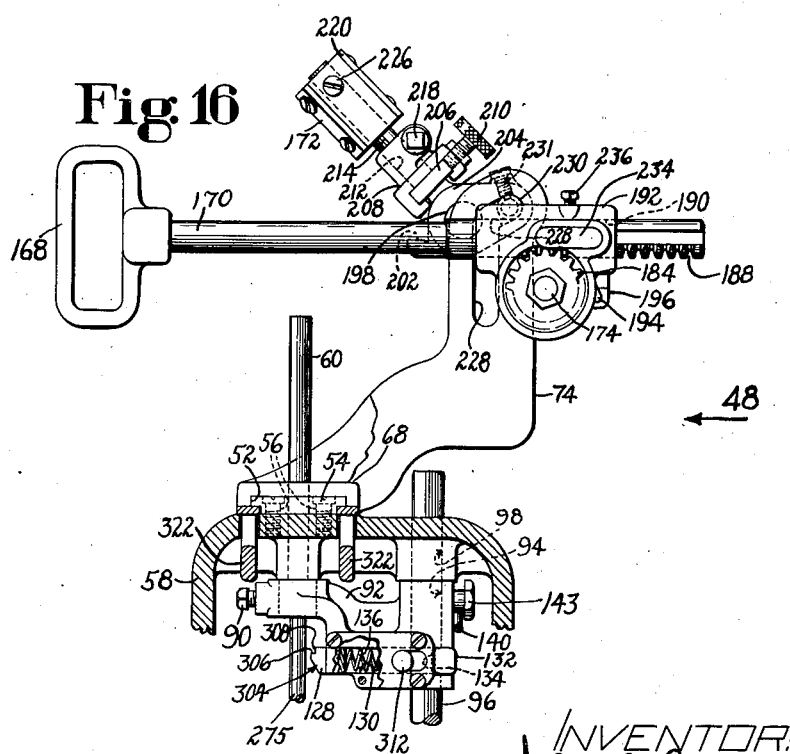
Fig. 16 is a side elevation of the clamp, the work support, and the last-measuring mechanism in their idle positions.

The illustrative machine is described with reference to attaching heels 30 to the fitted heel seats 32 (Figs. 14 and 19) of shoes 34 by the use of screws 36 (Figs. 5, 17 and 19) and comprises drilling and screw-driving units 38 (Figs. 2, 3 and 4), 40 (Figs. 2 and 5), respectively which are arranged side by side, as best shown in Fig. 2. The drilling unit 38 is provided with mechanism comprising a vertically movable drill 42 (Figs. 2, 3, 4 and 18) for forming a hole 44 (Fig. 5) extending through the heel seat 32 of the shoe, which is mounted upon a last 46, and into the heel 30 clamped to the heel seat of the shoe, the assembled last, shoe and heel being held securely in a predetermined position in a work-supporting and clamping unit 48 (Figs. 1, 2 and 16). The screw-driving unit 40 is provided with mechanism comprising a driver 50 (Figs. 2 and 5) for driving the screw 36 into the previously formed hole 44 in order permanently to secure the heel 30 to the shoe 34.

The work-supporting and clamping unit 48 has guideways 52 for receiving a rectilinear guide 54 secured by screws 56 (Figs. 1, 16 and 17) to the machine frame 58 and is movable along the guide from its full line position above the drilling unit 38 (Fig. 2) to its dot-dash line position above the screw-inserting unit 40 in order to locate the work in positions to be operated upon first by the drill 42 and then by the screw driver 50. As will be described later, the drill 42 and the screw driver 50 are raised, to perform their operations, in measuring and screw-guiding tubes, sleeves or hollow spindles 60, 62, respectively (Figs. 1, 2 and 5), which are received, preparatory to the performance of the drilling and screw-inserting operations, by a cylindrical passage 64 (Figs. 1, 3, 4, 5 and 19) extending heightwise through the cone of the last 46.

The transferring of the work-supporting and clamping unit 48 from drill-receiving position to screw-driver-receiving position and back again, as well as the raising and lowering of the drill 42 and the screw driver 50, is performed automatically, the screw 36, as will appear later, being supplied manually to the driver through an opening or hole 66 (Fig. 17) in a support, work-supporting table or jack 68 of the work-supporting and clamping unit 48.

The machine frame 58 houses most of the operating mechanism of the machine. Portions of the drilling unit 38, the screw-driving unit 40, and mask-setting mechanism, which will be described in detail later, are mounted upon a casting 70 (Figs. 2 to 5 and 11) which may be readily secured to and removed from the main frame through the provision of screws 72.

Mounted upon a bracket 74 extending upwardly and rearwardly from the table 68 is manually operated mechanism for forcing the heel 30, to the attaching face of which glue has been applied, against the fitted and the glue-coated heel seat 32 of the shoe positioned upon the table, preparatory to depressing a treadle rod 76 (Figs. 1 and 2) which trips a one-revolution clutch 78 (Fig. 2) to actuate drilling, work-transferring and screw-driving mechanism.

The cones of lasts 46 differ in height in accordance with differences in the sizes and/or styles of the shoes built on said lasts. Since the table 68 upon which the last 46 rests is not adjustable heightwise of the machine, the length of the upward stroke of the drill 42 is varied in accordance with the heights of the cones of the lasts upon which the shoes being operated upon are mounted, thereby insuring that the hole 44 (Fig. 5) formed in each of the fitted heel seats of the shoes and their heels shall be of a constant depth irrespective of the sizes and/or styles of the shoes. For the same reason, the length of the upward stroke of the screw driver 50 is varied in accordance with the different heights of the cones of the lasts 46 upon which the shoes 34 are mounted, therefore insuring that the heads of the screws 36, which are of the same size, shall be driven flush with the inside faces of the heel ends of the insoles 80 of the shoes, as best shown in Fig. 19.

With the above considerations in view, the illustrative machine is provided with mechanism comprising the tube 60, for measuring the height of the cone of the last 46 and for regulating, through mechanism which will be described later, the extent of upward travel of the drill 42 and the screw driver 50 in accordance with the measured height of said cone. The measuring tube 60 may be referred to as a feeler, a hollow spindle, or a combined last pin and shoe-position-testing member. When the work-supporting table 68 is in its drill-receiving position upon the guide 54, the measuring tube is movable in registering openings or holes 81, 82 and 84 (Figs. 1, 3, 13 and 17) formed in the table 68, the guide 54 and the machine frame 58, respectively, and when the table is in its driver-receiving position, shown in Fig. 5, the screw-guiding tube 62 is movable in registering openings or holes 81, 86 and 88 formed in the table 68, the guide 54, and the machine frame 58, respectively.

Figure 3:
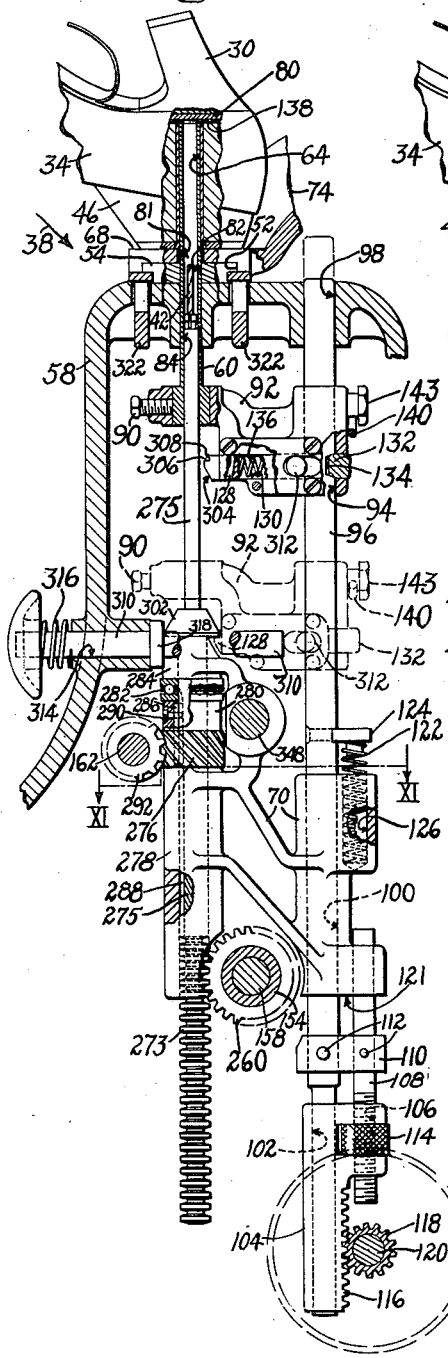
Fig. 3 is a view on line III—III of Fig. 2, showing portions of the drilling and last-measuring mechanism of the machine just prior to the drilling operation.

The lower portion of the measuring tube 60 is secured by means comprising a setscrew 90 to a bracket 92 having a bore 94 for receiving a rod 96 which is guided for vertical movement in bores 98, 100 in bosses of the machine frame 58 and the casting 70, respectively. As best shown in Fig. 3, the lower end of the rod 96 fits in a bore 102 of a block 104 which has another bore 106 for receiving the lower threaded end of a small rod 108 secured by a bracer arm 110 and pins 112 to the rod 96. Threaded onto the rod 108 and fitting between shoulders of the block 104 is a thumb nut 114 which may be rotated to vary the heightwise position of the block on the rods 96, 108. The block 104 has a rack 116 (Figs. 2 and 3) which meshes with a small pinion 118 mounted upon a shaft 120 journaled in the machine frame.

When the machine is idle, the rod 96 is held in a raised position, in which the bracer arm 110 engages an abutment face 121 (Fig. 3) of the stationary casting 70, by a spring 122 one end of which engages a lug 124 secured to the rod 96 and the other end of which fits in a recess 126 in the casting 70. The bracket 92 at this time is secured to the rod 96 by a latch 128 which is movable in a guideway 130 of the bracket 92 and has a lug 132 fitting in a notch 134 of the rod 96, the latch being constantly urged to the left, as viewed in Figs. 1, 3, 4 and 10, by a spring 136 opposite ends of which are in engagement with the bracket and the latch, respectively.

Figure 17:
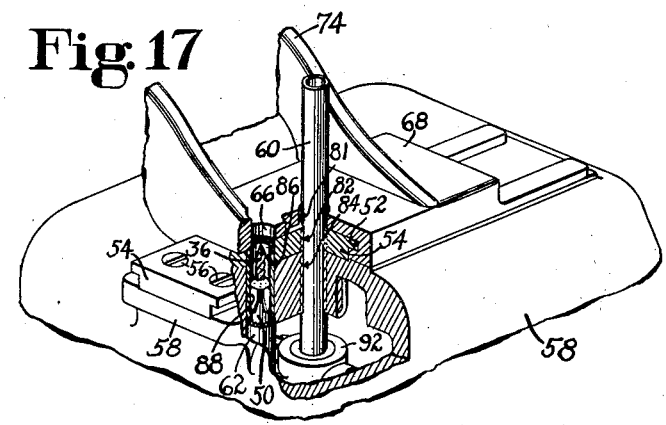
Fig. 17 is an enlarged angular view, partly broken away, of the work support.

When the work is presented to the machine, the measuring tube 60 is in its raised idle position above the table 68, as shown in Figs. 16 and 17. The last 46 upon which the shoe 34 is mounted is then placed bottom up on the measuring tube 60, which is received in the passage 64 of the last. Upon contact of the heel plate 138 of the last 46 with the upper end of the tube 60, the work depresses the tube against the action of the spring 122, as well as against the action of a torsion spring 140 (Fig. 2), until the crown of the last engages the table 68, the rod 96 being lowered a predetermined distance in accordance with the height of the cone of the last. It will be understood that, if desirable, the heel plate portion of the passage 64 in the last may be as large as the remaining portion of said passage, in which event the tube 60 will be contacted directly by the insole 80 of the shoe.

As best shown in Fig. 2, the torsion spring 140, the purpose of which will appear later, encircles a stud 142 screwed into the machine frame. One end of the spring 140 is thus secured to the main frame 58 and the other end of the spring is constantly in engagement with the bottom portion of a stud 143 carried by the bracket 92.

The shaft 120, which is operatively connected to the measuring tube 60 through the above-described mechanism, has keyed to it pinions 144 (Figs. 2, 3 and 6), 145 (Figs. 2 and 7) meshing with teeth 146, 148 of masks or shields 150, 152, respectively. As best shown in Fig. 2, the masks 150, 152 are rotatively mounted upon sleeves 154, 156, respectively, which are mounted for rotation upon a drive shaft 158 rotatable in bearings of the machine frame.

In order to retain the masks 150, 152 in their rotated operative positions upon the sleeves 154, 156, thereby holding the rod 96 in its depressed last-measuring position against the action of the spring 122 until near the end of the screw-driving operation, there are provided pawls 160 which are pivoted on a drill-rotating shaft 162 of the machine and have teeth which are normally held in engagement with serrations 164 of the masks 150, 152 by leaf springs 166, respectively, secured to the machine frame. The positions to which the masks 150, 152 are rotatably adjusted determine the amount of upward movement of the drill 42 and the screw driver 50, respectively.

Work-clamping mechanism

When the measuring tube 60 has been depressed, as above described, and the shoe upon the tube has been swung into a position in which its lengthwise dimension extends forwardly and rearwardly of the machine, the operator grips a handle 168 (Figs. 1, 2, 12, 16 and 20) of a clamp-operating rod 170 and draws the same forwardly, causing heel clamps 172 to be lowered from their raised idle positions, shown in Fig. 16, into engagement with the opposite sides of the heel positioned upon the heel seat of the shoe. The rod 170 may be rotated a quarter of a turn about its axis in a counterclockwise direction, as viewed from the front of the machine, in order to cause said rod to serve as a lever fulcrumed about the axis of a shaft 174 which is journaled in bosses 176 (Figs. 2 and 12) of the upstanding bracket 74 of the work-positioning and clamping unit 48. By providing mechanism which, as will appear later, affords a mechanical advantage, downward rotative pressure exerted against the handle 168 of the rod 170 by the operator causes the clamps 172 to exert considerable pressure against the heel 30 mounted upon the heel seat of the shoe 34, with the result that during the drilling and the screw-driving operations the heel is held securely against said heel seat and the shoe upon the last is effectively secured against movement upon the table 68.

The bracket 74 has a T-shaped vertical guideway 178 (Figs. 2, 12 and 13) in which a rack portion 180 of a carrier 182 is vertically movable. Secured to the shaft 174 are gears 184, 186 which mesh with rack portions 188, 180 of the rod 170 and the carrier 182, respectively. The hand rod 170 is mounted for forward and rearward sliding movement in a bore 190 formed in a housing or block 192 (Fig. 15) pivoted upon the shaft 174. As above stated, the hand rod 170 may also be rotated approximately 90° about its axis with relation to the housing 192 in order to lock the rod securely to the gear 184 and to the housing, as will appear later. The housing 192 is normally held upon the shaft 174, with its bore 190 in a horizontal position, by a coil spring 194 (Figs. 2 and 12) opposite ends of which are secured to the housing and to an extension 196 of one of the bosses 176.

The carrier 182 comprises a fulcrum pin 198, which is secured to the main body of the carrier by a screw 200 (Figs. 12 and 13), and a forwardly located ledge 202. Journaled upon the fulcrum pin 198 is a yoke 204 which may be referred to as a supported portion of the carrier and comprises a laterally extending beam 206 to which clamp holders 208 are secured in different widthwise adjusted positions through the provision of screws 210 threaded into corresponding holders and normally forced with clamping pressure against the beam.

The shank portion of each of the holders 208 is split lengthwise, as best shown in Fig. 12, and has a cylindrical bore 212 (Figs. 13 and 16) for receiving a cylindrical shank 214 of the corresponding heel-engaging clamp 172, the arrangement being such that each of the shanks of the clamps may be moved to the desired adjusted position lengthwise of and about its axis, the clamp then being secured to its associated holder through the provision of a binding screw 218 which is threaded into one split portion of the shank of the clamp holder and has a head engaging the opposite split portion of said shank.

Each of the clamps 172 comprises a rubber pad 220 (Fig. 14) which may be forced with considerable pressure against the heel 30 without danger of damaging the cover 222 (Fig. 19) of the heel. In order that the clamps 172 may orient themselves to the sides of heels 30 of different sizes and/or styles, the clamps are free to pivot slightly about their shank portions 214 under pressure of the work. Such pivoting is effected by providing the shank portion 214 of each of the clamps with an arcuate slot 224 into which extends a pin 226 screwed in a corresponding clamp.

Formed at opposite sides of the bracket 74 are a pair of cam slots 228 (Figs 2, 13 and 16) in which fit pins 230 secured by screws 231 to the yoke 204, the arrangement being such that when the operator moves the hand rod 170 rearwardly the carrier 182, together with the yoke 204 supported thereby, is raised vertically, the pins 230 on the yoke moving along vertically disposed portions of the cam slots 228. When the pins 230 travel along ramp portions 232 of the cam slots 228, the yoke 204 is rotated in a clockwise direction, as viewed in Figs. 1, 13 and 16, about the fulcrum pin 198, thereby swinging the clamps 172 with relation to the carrier 182 into their raised positions, shown in Fig. 16, preparatory to removing the work from the machine.

After the last 46 upon which the shoe 34 is mounted has been placed upon the measuring tube 60, the work is depressed by hand until the crown of the last engages the table 68, the shoe as it is depressed being turned slightly upon the tube so that its lengthwise dimension extends forwardly and rearwardly of the machine, such turning movement being desirable in order to bring the clamps 172 down against the heel, as will appear later. The heel 30 is then positioned upon the fitted heel seat 32 of the shoe and the hand-operated rod 170 is drawn forwardly, causing the carrier 182 to be lowered in its guideway 178 of the upstanding bracket 74. During the first part of the downward movement of the carrier 182, the pins 230 secured to the yoke 204 ride down the ramp portions 232 and into the vertical portions of the cam slots 228, causing the yoke 204, together with the clamp holders 208, to rotate in a counterclockwise direction, as viewed in Figs. 1, 13 and 16, with relation to the carrier, the beam 206 of the yoke during such movement engaging the ledge 202 of the carrier. As the rod 170 continues to be drawn forwardly, the carrier 182 and the yoke 204 are moved vertically downward as a unit until the clamps 172 engage opposite sides of the heel positioned upon the heel seat of the shoe. The rod 170 is then rotated axially a quarter of a turn in a counterclockwise direction, as viewed from the front of the machine, to force teeth of the rack 188 between teeth of a locking key 234 which is secured to the housing 192 by a lock screw 236, thereby locking the rod 170, the carrier 182 and the housing 192 together. With such an arrangement the operator can, without undue exertion, cause the clamps 172 to be forced against the heel with considerable pressure by reason of the mechanical advantage afforded, such advantage in the illustrative machine being, as shown in Fig. 12, equal to the distance A (representing the distance between the axis of the fulcrum pin 198 and the portion of the handle 168 gripped by the operator) over B (representing the distance between the axis of the fulcrum pin 198 and the centers of driving pressure of the teeth of the gear 186).

Drill-operating mechanism

The sleeve 154 upon which the mask 150 is rotatably mounted has secured to it by a binding screw 238 (Fig. 6) a ratchet 240. Secured to the drive shaft 158 is a cam 242 having a cam track 244 (Figs. 2 and 6). Movable in the cam track 244 is a cam roll 246 carried by a gear segment 248 which is pivoted upon the drill-rotating shaft 162 and meshes with a pinion 250 loosely mounted upon the shaft 158 and formed integral with an actuating arm 252. Pivoted to the outer end of the actuating arm 252 is a pawl 254 having a tooth 256 (Fig. 2) which is arranged opposite the ratchet 240 and is constantly urged toward said ratchet by a spring 258, one end of the spring being secured to the outer end of the actuating arm and the other end of the spring engaging the outer face of the pawl. The ratchet 240 is secured by the binding screw 238 to the sleeve 154 which is formed integral with a drill-raising pinion 260 (Figs. 2 and 3).

The pawl 254 carries a roll 262 (Fig. 6) which, when the machine is idle, is held against a concentric high portion 264 of the inside face of the mask 150. As will appear later, when the mask 150 is in its operative position, determined by the measured height of the cone of the last 46 through mechanism above described, a concentric low portion 266 of the inside face of the mask 150 is located a short distance circumferentially ahead of the roll 262 of the pawl 254.

The actuating arm 252 has a constant arc of travel and during a portion of its forward movement, that is, its movement in a clockwise direction as viewed in Fig. 6, causes the ratchet 240 to move with it in a clockwise direction. During the first part of the forward movement of the actuating arm 252 the tooth 256 of the pawl 254 is held away from the teeth of the ratchet 240 by reason of the fact that the roll 262 carried by the ratchet is in engagement with the high portion 264 of the inside face of the mask 150. Upon continued forward movement of the actuating arm 252 the pawl 254 drops down a shoulder 268 connecting the high and low concentric portions 264, 266, respectively, of the inside face of the mask 150, thus permitting the tooth 256 of the pawl, under the action of the spring 258, to be moved into and to be held in engagement with teeth of the ratchet 240, with the result that the ratchet is moved, together with the actuating arm, in a clockwise direction. It will therefore be clear that the arc of travel of the ratchet 240, and accordingly the upward travel of the drill 42, which is operatively connected, through the pinion 260 and other mechanism to be described presently, to the ratchet, varies in accordance with the setting of the mask 150, such variation being due to introducing into the movement of the actuating arm 252 a variable amount of lost motion.

In order to insure that after the drilling operation the drill 42 and the drill-actuating mechanism shall be quickly and fully retracted to their starting positions against the action of the torsion spring 140, as will appear later, the ratchet 240 is provided with an arcuate slot 270 in which fits a pin 272 secured by a nut 274 to the actuating arm 252. As the actuating arm 252 swings in a counterclockwise direction, as viewed in Fig. 6, back to its starting position, the pin 272 engages the rear end of the slot 270 of the ratchet 240 and moves the ratchet with it. Movement of the ratchet 240 back to its starting position causes the drill 42, together with its operating mechanism to be moved back to its starting position.

The drill-raising pinion 260 (Figs. 2 and 3), which is secured to the sleeve 154, meshes with circumferential spur gear teeth 273 of a spindle 275 which is rotatably supported in the casting 70. A spiral gear 276 is mounted for rotation with the spindle 275 and has its bottom face in engagement with a boss 278 (Figs. 3 and 4) of the casting 70 and an extension 280 thereof in engagement with a thrust bearing 282 which engages a boss 284 of the casting. In order that the spindle 275 may be raised and lowered as it is rotated, a key 286 (Fig. 3) fitting in a slot 288 of the spindle is secured by a screw 290 to the extension 280 of the spiral gear 276.

The spindle 275 is rotated by a spiral gear 292 which meshes with the spiral gear 276. The spiral gear 292 is secured upon the drill-operating shaft 162 which is continuously rotated by a belt 294 (Fig. 2) when the machine is in use.

The upper end of the spindle 275 is provided with a recess 296 (Fig. 18) having a threaded portion and a flaring entrance. The drill 42 is carried by a chuck 298 having a threaded shank and is positioned in the chuck with its end extending a predetermined distance above the surface 300 of the chuck. As the chuck 298 is screwed into the spindle 275, the jaws of the chuck are clamped against the drill 42 by reason of the wedging effect of the flaring entrance of the recess 296 upon the chuck, with the result that the drill and the chuck are effectively secured for movement with the spindle.

Mechanism for retracting and releasing the measuring tube 60

Pinned to the spindle 275 is a frusto-conical block 302 which is utilized to move the measuring tube 60 to its lowered position, shown in Fig. 4, without disturbing the last-measuring position of the rod 96, preparatory to moving the shoe-supporting and clamping unit 48 from drill-receiving position to screw-driver-receiving position, shown in full and dot-dash lines, respectively, in Fig. 2. While the drill spindle 275 is being raised to form the hole 44 in the heel seat of the shoe and the heel clamped thereto, the frusto-conical block 302 engages an undercut face 304 (Figs. 1, 3 and 16) of the latch 128, causing said latch to move to the right with relation to the bracket 92 so as to withdraw the lug 132 of the latch from the notch 134 formed in the rod 96. Upward movement of the drill spindle 275 ceases when the block 302 has been raised to a position just above a face 306 (Figs. 1, 3 and 16) of the latch 128, at which time the latch is moved slightly to the left by the spring 136, until a shoulder 308 of the latch is forced against the block, said movement not being sufficient to enable the lug 132 to enter the notch 134.

During the retractive movement of the drill spindle 275 the bracket 92 is lowered, together with the spindle, against the action of the torsion spring 140 (Fig. 1), with the result that the measuring tube 60 is lowered to its retracted position, shown in Fig. 4 (dash line, Fig. 3). As will appear later, after the machine has completed its cycle of operation and the work has been removed from the machine, a hand-operated release slide 310 is moved rearwardly against a projecting arm 312 screwed into the latch 128 to move the lug 132 of the latch out of the notch 134 in the rod 96, thereby enabling the bracket 92 to be raised to its starting position, shown in Fig. 16, by the torsion spring 140.

The release slide 310 is movable in a guideway 314 of the machine frame and is normally held in its forward idle position by a spring 316 against which pressure is exerted by the slide to release the bracket 92. Forward movement of the release slide 310 under the action of the spring 316 is limited by contact of a collar 318, which is secured to the slide, with the machine frame. When the bracket 92 is released, it is raised by the torsion spring 140 until the bracer arm 110 (Fig. 3) carried by the rod 96 engages the face 121 of the casting 70, the rod 96 at such time being in its raised starting position and the lug 132 of the latch 128 being in engagement with the notch 134 in the rod.

*Mechanism for sliding the work-supporting and clamping unit 48*

In order to move the work-supporting and clamping unit 48 after the completion of the drilling operation to an operative position above the screw-driving unit 40 (Fig. 5), in which position the hole 81 in the table 68 registers with holes 86 and 88 in the guide 54 and the machine frame 58, respectively, the table is provided with depending bifurcations 322 (Figs. 2 and 8) in which fit blocks 324, respectively, each provided with a circular flange 326 which engages an inner face 328 of a corresponding bifurcation. Each of the blocks 224 has a cylindrical bore 330 for receiving an eccentric portion 332 of a pin 334 (Fig. 8) which is secured by a screw 336 to the upper end of a lever 338, the screw being threaded into the lever and having an end in engagement with the pin. In order to effect a setting-up adjustment of the table 68 upon the guide 54, the screw 336 is released and the pin 334 is rotated in the blocks 324, the screw being clamped against the pin after the proper adjustment has been made.

The lever 338 is pivoted on a stub shaft 340 and has in its lower bifurcated end 342 a block 344 (Fig. 8) which is pivotally mounted upon a pin 345 threaded into a carriage 346 which is slidable upon a screw-driver-raising shaft 348 (Figs. 2, 4 and 8) mounted in bearings of the machine frame. Mounted upon a fulcrum pin 350 secured to the carriage 346 is a cam roll 352 which fits in a cam groove 354 formed in the periphery of the cam 242. The construction and arrangement of the above-described mechanism is such that when the machine is idle the hole 81 in the table 68 is in registration with the holes 82, 84 of the guide 54 and the main frame 58, respectively, and after the work has been drilled and the measuring tube 60 has been moved to its lowered position, the table moves to a position in which its hole 81 registers with holes 86, 88 in the guide 54 and the main frame 58, respectively, through which holes the screw-guiding sleeve 62 and the screw driver 50 travel. After the screw 36 has been inserted in the work and the driver 50 and the screw-guiding sleeve 62 have been lowered to their retracted positions, by mechanism which will be described later, the table 68 is moved back automatically to its initial starting position upon the guide 54.

*Screw-driver-lifting mechanism*

The screw-driving mechanism, which is similar in many respects to the drill-operating mechanism, will now be described. The sleeve 156 (Figs. 2 and 7) upon which the mask 152 is rotatably mounted, is formed integral with a ratchet 356. Rotatably mounted upon the drill-rotating shaft 162 is a segment gear 358 (Figs. 2, 8 and 9) having mounted on it a roll 360 which fits in a track 362 formed in the left face, as viewed in Fig. 2, of the cam 242. The segment gear 358 meshes with a pinion 364 which is loosely mounted upon the drive shaft 158 and is formed integral with an actuating disk 368 (Figs. 2 and 7). Pivoted to the actuating disk 368 is a pawl 370 (Fig. 7) which is interposed between the inside face of the mask 152 and the ratchet 356. The pawl 370 is provided with a tooth 372 which is constantly urged toward the teeth of the ratchet 356 by a spring 374, one end of which is secured to the actuating disk 368 and the other end of which is in engagement with the outer face of the pawl. When the machine is idle, the tooth 372 of the pawl 370 is held away from the teeth of the ratchet 356 by reason of the fact that a roll 376 carried by the pawl engages a high concentric portion 378 of the inside face of the mask 152. The segment gear 358, and therefore the actuating disk 368 operatively connected to it, has a constant arc of travel.

It will be clear that when the roll 376 of the pawl 370 is in engagement with the high concentric portion 378 of the inside face of the mask 152 the actuating disk 368 is not operatively connected to the ratchet 356 and, accordingly, during the first part of the rotation of the actuating disk 368 in a clockwise direction, as viewed in Fig. 7, no movement will be imparted to the ratchet. However, after the actuating disk 368 has rotated sufficiently in a clockwise direction, as viewed in Fig. 7, to enable the roll 376 to move down a shoulder 380 and onto a low concentric portion 382 of the inside face of the mask 152, the tooth 372 of the pawl 370 is forced into engagement with teeth of the ratchet 356 by the leaf spring 374, with the result that from then on the ratchet rotates through the same arc as the actuating disk. It will thus be clear that the amount of rotation of the ratchet 356 and, accordingly, through mechanism which will be described later, the amount of upward travel of the screw driver 50 may be varied in accordance with the setting of the mask 152.

Secured by a key 384 (Figs. 1 and 2) to the sleeve 156 is a pinion 386 which meshes with a pinion 387 rotatably mounted upon a stub shaft 388 carried by the machine frame. The pinion 387 meshes with a pinion 390 which is secured to one end of the screw-driver-raising shaft 348. Secured to the other end of the shaft 348 is a gear 392 meshing with circumferential spur gear teeth 394 (Fig. 5) formed upon the driver 50 which is mounted for vertical reciprocation in a bore 396 of the casting 70 and is adapted to insert into the work screws of the Phillips head type.

Mounted upon the driver 50 is the screw-guiding sleeve 62 to the lower end of which a split lug 398 (Figs. 1, 2 and 5) is secured by a clamp screw 400. Secured by a clamp screw 402 (Fig. 5) to the driver 50 is a split lug 404 into which is threaded a rod 406 which fits slidingly in a bore 408 of the lug 398. A spring 410, opposite ends of which engage the lugs 398, 404, respectively, encircles the rod 406. The spring 410 normally retains the sleeve 62 in its raised position, shown in Fig. 5, upon the screw driver 50, the arrangement between the sleeve and the screw driver being such that when any one of the screws 36 is dropped in the hole 66 of the work table 68 and into the upper end of the sleeve the head of the screw will rest on the driver, the pointed end of the screw being approximately in alinement with the upper end of the sleeve which lies just beneath the table 68. In order to insure against the sleeve 62 being turned, the lug 398 has a flat face which is constantly in contact with a flat face 411 (Fig. 2) of the machine frame.

In order to insure that the screw driver 50 and operating mechanism therefor shall return to their starting positions after the screw has been driven into the work, the actuating disk 368 carries a pin 412 (Figs. 2 and 7) which fits in an arcuate slot 414 of the ratchet 356. When the actuating disk 368 is rotated in a counterclockwise direction, as viewed in Fig. 7, back to its starting position, the pin 412 engages the rear end of the slot 414 and moves the ratchet 356, together with the screw-inserting mechanism operatively connected thereto, back to its starting position.

The masks 150 and 152 are released during the latter part of the retractive stroke of the segment gear 358 through the provision of a lug 416 (Figs. 1, 6, 8 and 9) which is secured by screws 418 to said gear and engages steps 420 of the pawls 160, causing said pawls to be swung away from corresponding masks. The masks 150, 152, after being released, are swung in a counterclockwise direction, as viewed in Figs. 6, 7 and 9, by the action of the spring-actuated rod 96 which is operatively connected to the masks, as above described, and which, upon release of the masks, is moved back to its raised starting position by the spring 122.

Figure 5:
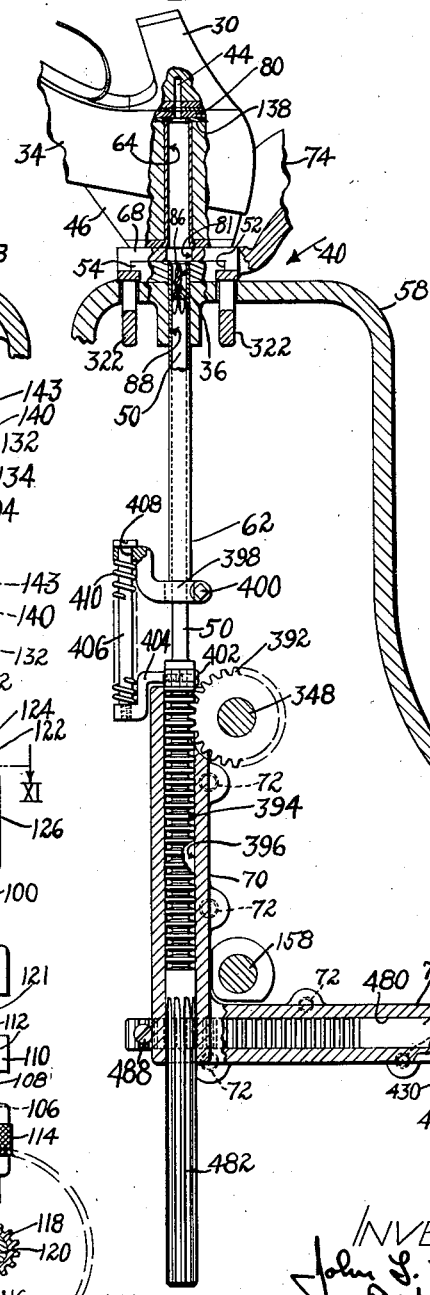
Fig. 5 is a sectional view on line V—V of Fig. 2, showing portions of the screw-driving mechanism.
Figure 18:
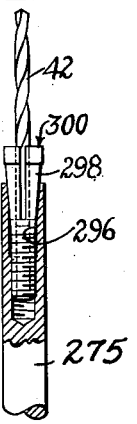
Fig. 18 is an enlarged side view, partly in section, of mechanism for securing the drill to a drill-operating spindle.

As the screw driver 50 is raised from its lowered idle position, shown in Fig. 5, the screw-guiding sleeve 62 is moved into engagement with the heel plate 138 of the last 46 upon which the shoe is mounted and is then arrested by said plate. The driver 50, as it continues to move upwardly, slides a constant distance through the arrested sleeve 62 while driving the screw into the hole 44 (Fig. 5). By varying the amount of upward movement of the driver 50 in accordance with the measured height of the cone of the last, the head of the screw is driven flush with the inside face of the heel end of the insole of the shoe irrespective of the height of the last and therefore the heightwise position of the work in the machine.

The illustrative screw has steep-pitched threads 422 (Fig. 19) which make two complete turns. As will appear later, rotation of the screw driver during its upward operating stroke is delayed until the pointed end of the screw mounted thereon has been moved up to the heel seat of the last. Between such time and the arrival of the driver at the upper end of its stroke said driver is rotated through slightly more than two complete revolutions, upward movement of the driver ceasing when the head of the screw has been driven flush with the inside face of the heel end of the insole of the shoe. The axial advance of the screw caused by its rotation is equal to the upward axial advance of the driver, thereby insuring against stripping the heel material as the screw is being driven. When the driver has reached the upper end of its stroke, it ceases temporarily to rotate and is then lowered and rotated back to its idle starting position.

*Screw-driver-rotating mechanism*

The mechanism for rotating the screw driven 50 in timed relation with the screw-driver-lifting mechanism will now be described. Meshing with teeth of the actuating disk 368 (Figs. 1, 2 and 7) is a pinion 424 pinned to a shaft 426 the left end of which, as viewed in Fig. 2, is mounted in a bearing 428 of the machine frame and a reduced cylindrical portion 430 of which is supported in a cylindrical recess 432 of a stub shaft 434 rotatably mounted in a bearing 436 of the machine frame. Slidably mounted upon the shaft 426 is a block 438 provided with a notch 440 for receiving the pinion 424 and provided with a recess 442 for receiving a pin 444 which is secured to the block and fits slidably in a bore 446 of the machine frame.

The block 438 carries a cam roll 448 constantly forced against a cam 450 formed on the actuating disk 368 by a spring 452 which is housed in a bore 454 of the machine frame and has its opposite ends in engagement with the shaft 426 and a plug 456 threaded into the bore. Pinned to the right-hand end of the shaft 426, as viewed in Fig. 2, is a disk 458 having ratchet teeth 460 which, when the cam roll 448 is in engagement with a raised portion 462 (Figs. 1 and 7) of the cam 450, are held out of engagement with ratchet teeth 464 of a disk 466 secured to the stub shaft 434. The stub shaft 434 is normally held in its idle position, shown in Fig. 2, by a torsion spring 468 one end of which is secured in a recess of the machine frame and the other end of which is secured in a recess of a collar 474 secured to the stub shaft 434. Pinned to the stub shaft 434 is a pinion 476 (Figs. 2 and 5) meshing with a rack 478 which is slidable in a guideway 480 of the casting 70 and meshes with pinion teeth 482 of the screw driver 50.

As above stated, when the upwardly traveling driver has moved the pointed end of the screw mounted thereon up to the heel seat of the last, it starts to rotate and completes two revolutions before arriving at the top of its stroke. Since the lift of the driver per revolution is equal to the pitch of the screw, the screw will enter the work without any tendency to strip the same.

When the cam roll 448 of the block 438 moves down a shoulder 484 (Figs. 1 and 7) of the cam 450, the point of the upwardly moving screw 36 on the driver 50 is just about to enter the hole 44 (Fig. 5) formed in the work by the drill 42. As the cam roll 448 runs down the shoulder 484 and into engagement with a low portion 486 of the cam 450, the shaft 426 moves to the right, as viewed in Fig. 2, under the action of the spring 452, with the result that the ratchet teeth 460 of the disk 458 move into meshing relation with the ratchet teeth 464 of the disk 466 and, accordingly, rotate the stub shaft 434 against the action of the torsion spring 468 so as to move the rack 478 to the left, as viewed in Fig. 5, and to cause it to rotate the screw driver 50. When the screw driver has completed two revolutions, at which time the head of the screw 36 is driven flush with the inside face of the heel end of the insole 80 of the shoe 34, its upward, as well as its rotative, movement ceases. The screw driver 50 is then retracted to its lowered starting position, best shown in Fig. 5, by the above-described mechanism. As the screw driver 50 is lowered, the guide sleeve 62 is returned to its idle position upon the driver by the spring 410.

The screw driver 50 is rotated back to its starting position during the first part of its downward movement. Even should the teeth 460 of the disk 458 jump one or more teeth 464 of the disk 466 during initial downward movement of the screw driver 50, because of any tendency on the part of the driven screw 36 temporarily to prevent the driver at the extreme upper end of its stroke from being rotated in a reverse direction, it will be clear that the disk 466 is moved back to and held in its initial starting position by the spring 468, as determined by engagement of a screw 488 (Fig. 5) carried by the rack 478 with the casting 70.

Although the machine has been described with reference to the measuring tube 60 and the screw-guiding sleeve 62 engaging the heel plate 138 of the last 46, applicant contemplates, if desirable, to have the hole in the heel plate of the last of the same size and shape as the cross-sectional dimension of the passage 64 in the last, in which case the measuring tube and the screw-guiding sleeve will abut against the insole of the shoe instead of against the said heel plate.

*Machine operation*

The operation of the machine is as follows. The last 46, together with the shoe 34 mounted thereon, is placed upon the measuring tube 60 which also serves as a last pin and is received in the passage 64 of the last until its upper end is engaged by the heel plate 138 of the last. The work is then depressed against upward yielding pressure of the measuring tube 60 until the crown of the last 46 engages the work table 68, the tube being held in its lowered position. The cone of the last 46 upon which the shoe 34 is mounted is thus measured heightwise by the tube 60 which, through the mechanism above described, sets the masks 150, 152 which regulate the amount of upward travel of the drill 42 and the screw driver 50, by introducing variable amounts of lost motion into the actuating strokes of operating mechanism for the drill and the screw driver in accordance with the measured heights of the lasts upon which the shoes are mounted.

Glue is then applied to the cup of the heel which is to be attached to the shoe and the heel is positioned upon the fitted heel seat 32 of the shoe, the shoe, together with the heel adhesively secured thereto, being rotated slightly upon the tube 60 to insure that the toe of the shoe extends toward the operator and that the lengthwise dimension of the shoe extends forwardly and rearwardly of the machine. With the shoe thus positioned, the operator grips the handle 168 of the clamp-operating rod 170 and slides the same forwardly, causing the clamps 172 to be lowered from their raised idle positions (Fig. 16) into engagement with the opposite sides of the heel of the shoe. As the clamps 172 engage the heel, the operator rotates the rod 170 a quarter of a turn in a counterclockwise direction, as viewed from the front of the machine, causing the rod to serve as a lever pivoted about the axis of the shaft 174, downward movement of the handle about said axis, because of the mechanical advantage provided, causing the clamps 172 to apply heavy pressure against the heel.

Sometime prior to starting the power-operated instrumentalities of the machine, one of the screws 36 which is to be used in attaching the heel 30 to the shoe 34 is dropped, head down, through the opening 66 (Fig. 17) in the table 68 and into the pocket formed by the screw-guiding sleeve 62 (Fig. 5) and the upper end of the screw driver 50.

The treadle rod 76 (Fig. 1) is then depressed to trip the one-revolution clutch 78 which rotates the drive shaft 158, thereby causing (1) the drill 42 to form the hole 44 in the heel seat of the shoe and the heel and to return to its idle position, (2) the work table 68 to be moved from its drill-receiving position to its screw-driver-receiving position, shown in full and dash-dot lines (Fig. 2), respectively, (3) the driver 50 to drive the screw 36 into the hole 44 and to return to its lowered idle position, (4) the masks 150, 152 to be released, and (5) the work table 68 to be returned to its idle drill-receiving position.

In order that the work table 68 may be slid along the guide 54 from its drill-receiving position to its screw-driver-receiving position, the measuring tube 60 must first be moved from its raised position to its lowered or retracted position, shown in Fig. 4. Through the provision of the frustoconical block 302, which is secured to the drill spindle 275, and other mechanism above described, the bracket 92, during the upward stroke of the drill 42, is disconnected from the vertical rod 96 which is operatively connected to the pawl-set masks 150, 152, said bracket being moved to its lowered position by the block 302 during the retractive movement of the drill.

When the driver 50 is raised to drive the screw 36 into the work, the sleeve 62, which is mounted for movement together with and relatively to the driver, engages the heel plate 138 of the last 46 and while the driver continues its upward movement, guides the head of the screw being driven into the work, thus insuring that the screw be driven at the proper angle. The screw driver 50, during its upward stroke, starts to rotate as the pointed end of the screw 36 enters the hole 44 formed in the work by the drill, upward movement of the driver being continued until the head of the screw is driven flush with the inner face of the insole of the shoe, at which time the driver ceases temporarily to rotate, and is then lowered and rotated back to its starting position. The upward axial advance of the screw 36 caused by its rotation is approximately equal to the upward axial advance of the driver 50, thus insuring that the screw shall turn into the work without stripping the same.

After the work table 68 has been returned to its drill-receiving position upon the guide 54, the machine comes to a stop, whereupon the operator grasps the toe of the shoe with his left hand and, after turning the clamp-operating rod 170 a quarter of a turn in a clockwise direction, as viewed from the front of the machine, slides the rod rearwardly to move the heel clamps 172 to their raised idle positions, shown in Fig. 16, and removes the work from the machine.

After the work has been removed from the machine, the operator moves the slide 310 rearwardly in order to release the measuring-tube-carrying bracket 92 and thus enable the measuring tube 60 and the bracket 92, under the action of the torsion spring 140, to be moved to their raised positions. At the end of the upward stroke of the bracket 92, the latch 128 of said bracket 92 slides into the notch 134 of the rod 96, thus securing the rod and the bracket together preparatory to operating upon the next shoe.

*Modified last-measuring mechanism*

There is shown in Figs. 20 to 23 inclusive, modified feeler mechanism operatively connected to the masks 150 and 152 for measuring the heights of the cones of lasts 46 upon which the shoes 34 to be operated upon are mounted. Such mechanism comprises an awl 490 having a shank fitting in an elongated slot 492 of an arm 494 which is pivotally mounted upon a treadle rod 496 and is located between a collar 498 pinned to the rod and a coil spring 500 upper and lower ends, respectively, of which engage a hub 502 of the arm and a bracket 504 secured by screws 506 to the machine frame. The upper end of the awl 490 is threaded to receive a nut 508 through the provision of which the awl is secured to the arm 494 in different adjusted positions lengthwise of the slot 492.

Figure 20:
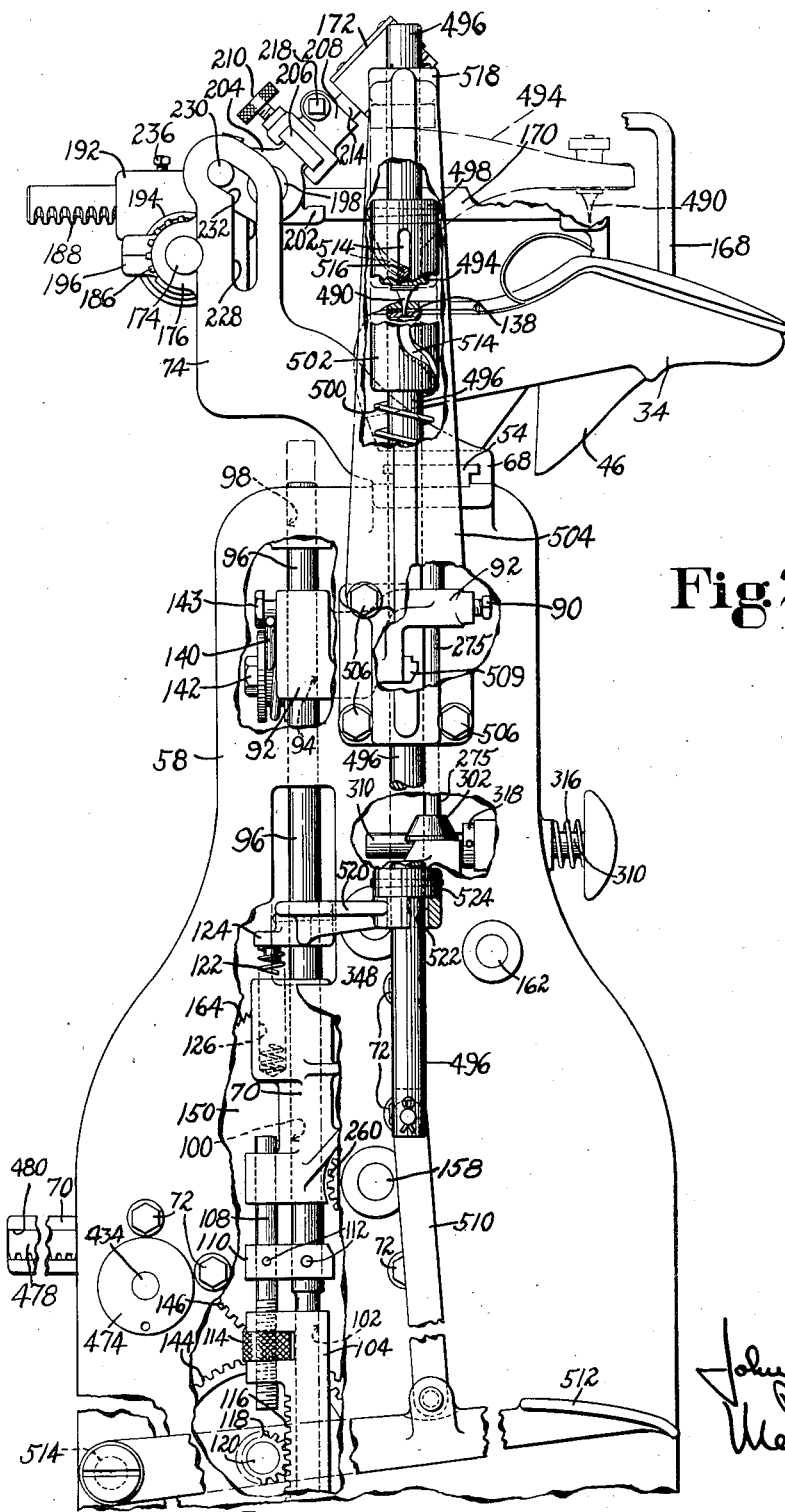

As will appear later, when the treadle rod 496 is depressed, the arm 494 is lowered and swings from its idle position, shown in dash lines, Figs. 20 and 22, to a position in which the awl 490 is arranged over and opposite the central part of the heel seat 32 of the shoe 34 positioned in the machine. Continued downward movement of the treadle rod 496 causes the awl 490 to pass through the heel seat 32 of the shoe and into engagement with the heel plate 138 of the last 46, as best shown in Fig. 23. Since the awl 490 pierces the heel seat 32 of the shoe 34 and moves into engagement with the outside face of the heel plate 138, said awl and associated operating mechanism may be referred to as outside last-measuring mechanism for testing the position of the work. Since the above-described measuring tube 60 operates against the inside face of the heel plate 138, said tube and the mechanism operated thereby may be described as inside last-measuring mechanism for testing the position of the work.

Preparatory to equipping the machine with outside last-measuring mechanism, a latch 509, similar to the latch 128 but lacking the lug 132, is substituted for the latch 128 in order that downward movement of the tube 60, which now serves as a last pin but not as a measuring tube, will not cause a corresponding downward movement of the rod 96.

The lower end of the treadle rod 496 is connected through a link 510 to a treadle 512 which is pivoted upon a fulcrum pin 514 threaded upon the machine frame 58. To cause the awl-carrying arm 494 mounted upon the rod 496 to swing from its idle position, shown in dash lines Figs. 20 and 22, to its operative position, shown in full lines, and back again when the treadle rod is moved vertically, the hub 502 of the arm 494 has formed in it a cam slot 514 in which fits a stud 516 secured to the bracket 504.

When the machine is idle, the collar 498 keyed to the rod 496 is held in engagement with a boss 518 of the bracket 504 by the spring 500, the stud 516 at this time being in registration with a curved lower portion of the cam slot 514. As the arm 494 is lowered by depressing the treadle rod 496, it is rotated in a counterclockwise direction, as viewed in Fig. 22, upon the rod 496, by reason of the engagement of the stud in the curved lower portion of the slot 514, until the awl 490 is arranged directly over the heel seat 32 of the shoe 34 positioned upon the table 63. The arm 494 is then held against further rotation upon the rod 496 during its continued downward movement by the engagement of the stud 516 in the straight vertically disposed portion of the slot 514.

In order that downward movement of the treadle rod 496 shall effect a corresponding downward movement of the rod 96, which, as above described, is operatively connected to the masks 150, 152 and the setting of which determines the amount of upward travel of the drill 42 and the screw driver 50, the rod 96 has pinned to it a laterally and forwardly projecting arm 520 having a recess 522 through which the treadle rod 496 passes. Pinned to the treadle rod 496 is a collar 524 which, during downward movement of the treadle rod, engages the arm 520, causing the rod 96 to be moved downwardly together with the treadle rod until the awl 490 has been moved into engagement with the heel plate 138 of the last upon which the shoe positioned in the machine is mounted. When the last 46 has been measured heightwise, the treadle 512 is released, the arm 494 being elevated to its raised position, shown in dash lines Figs. 20 and 22, by the spring 500.

When the machine is equipped with the outside measuring mechanism illustrated in Figs. 20 to 23 inclusive, the operation of the machine is practically the same as that of the machine shown in Figs. 1 to 18 inclusive. In order to measure the height of the last 46, and therefore the position of the heel seat 32 of the shoe 34 to be operated upon, the operator depresses the treadle 512, causing the awl 490, as it is depressed, to swing from its inoperative position, shown in dash lines Figs. 20 and 22, to its full-line position, shown in said figures, the awl passing through the heel seat of the shoe and engaging the heel plate of the last. After the proper measurement has been effected, the treadle 512 is released and the awl swings back to its inoperative position. As above described, the awl 490 is operatively connected, through the rod 96, to the masks 150, 152 and sets the same in accordance with the position of the work in the machine, the masks retaining their set positions until after the screw-driving operation.

Having described my invention, what I claim as new and desire to secure by Letters Patent of the United States is:

1. In a fastening-inserting machine, means for supporting work in different positions, a rotatable tool for operating upon the supported work, power-operated means for reciprocating said tool, a member for testing the position of the work, and means governed by said member for controlling the amount of reciprocation of the tool.

2. In a fastening-inserting machine, a support for a shoe mounted upon a last having a passage, a feeler which is constructed and arranged to enter the passage and is movable under pressure of the work, a tool movable through said passage for attaching a heel to the shoe, and means governed by the feeler for controlling the amount of movement of the tool.

3. The combination with a fixed support for work, of a member for testing the position of said work, said member being yieldingly movable in one direction in response to pressure of the work against it, a tool for operating upon the work, means operatively connected to said member, and mechanism governed by the setting of said means for moving said tool toward the work different distances in a direction opposite to said one direction of movement of the testing member, in accordance with the position of said member, to cause the tool to operate upon said work.

4. The combination with a support for work, of a drill and a screw driver for operating upon the supported work, movable means for testing the position of the work, members operatively connected to said means, and mechanism governed by the setting of the members respectively for determining the amount of movement of the drill and the screw driver.

5. In a fastening-inserting machine, means for supporting work in different positions, a rotary drill, power-operated means for causing the drill to operate upon the supported work, a feeler for testing the position of the work, and means governed by the feeler for controlling the amount of movement of the drill.

6. A heel-attaching machine having, in combination, a support for a last upon which is mounted a shoe and which has a passage extending heightwise through its cone, a tube shaped and arranged to be received in said recess and upon engagement with a heel plate of the last to be moved under pressure of the last until the crown of the last engages the support, a tool movable through the tube for forming holes in the heel seat of the shoe and the heel, and means movable to a predetermined position in accordance with the position of the tube for regulating the length of the hole-forming stroke of the tool.

7. In a fastening-inserting machine, means for securing against movement any one of a plurality of work pieces which are mounted upon rigid forms of different sizes, a rotary tool for forming a hole in said one work piece, a rotatable member for carrying the tool, and power-operated means for reciprocating said member predetermined but variable distances in accordance with a dimension of the forms in order to produce action of the tool on the work pieces and to insure that the holes formed in the work pieces shall be of approximately the same depth irrespective of the size of the forms on which the work pieces are mounted.

8. In a fastening-inserting machine, a support for work pieces which are secured together and one of which is mounted upon a rigid form, means for measuring a dimension of the form, a rotary drill for forming registering holes in said work pieces, means for rotating the drill, means for effecting translatory movement of the drill, and means responsive to movement of said form-measuring means for varying the amount of translatory movement of the drill in accordance with the measured dimension of the form.

9. In a fastening-inserting machine, means for supporting work in different positions, a movable driver for inserting a screw into the supported work, a member movable under pressure of the work for testing the position of the work, and means governed by said member for controlling the amount of movement of the driver.

10. In a fastening-inserting machine, a support for a last upon which a shoe is mounted, means for measuring the height of the last, and inside fastening-inserting power-operated means mounted for movement to attach a heel to the shoe, the extent of movement of said fastening-inserting means being governed by the last-measuring means.

11. In a fastening inserting machine, a support for a last upon which a shoe is mounted and which has a passage extending heightwise through its cone, means for clamping a heel against the heel seat of the shoe and the crown of the last against the support, a power-operated tool movable through said passage for driving a fastening through the heel seat of the shoe and into the heel, means for measuring the height of the cone of the last, and mechanism operatively connected to the last-measuring means for varying the amount of movement of the tool.

12. In a fastening-inserting machine, means for clamping a work piece comprising two or more parts mounted upon a form, said form being one of a graduated series of forms of different sizes for receiving work pieces of different sizes, movable fastening-inserting means for securing said parts of the work pieces together, and power-operated means for moving said fastening-inserting means predetermined but variable distances in accordance with a dimension of the form to drive the top of the head of the fastening into substantial alinement with a portion of one of said parts of the work piece irrespective of the size of the form upon which said work piece is mounted.

13. In a fastening-inserting machine, a support having a hole, a guide tube which is movable in said hole, a fastening-inserting member movable together with and relatively to said tube, last-measuring means, and means responsive to movement of said last-measuring means for controlling the amount of movement of the fastening-inserting member.

14. In a heel-attaching machine, a support for a shoe mounted upon a last which has a passage extending heightwise through its cone, means for clamping a heel against the heel seat of the shoe, a rotatable driver, power-operated means for reciprocating the driver in the passage of the last to drive a screw through the heel seat of the shoe and into the heel, and means for regulating the extent of reciprocatory movement of the driver in accordance with the measured height of the cone of the last.

15. In a fastening-inserting machine, means for supporting work in different positions, a drill for operating upon the supported work, a driver for inserting a screw into said work, a member for testing the position of the work, and means operatively connected to said member for controlling the amount of movement of the drill and the driver.

16. The combination with a support for work, of a movable drill and a movable screw driver for operating upon the supported work, a member movable in the support relatively to said drill for testing the position of said work, and means governed by the member for controlling the amount of movement of the drill and the screw driver.

17. The combination with a support for work, of a drill and a screw driver for operating upon the supported work, a movable member for testing the position of said work, means for operating the drill and the screw driver, and mechanism governed by said member for introducing into the movement of said means a variable amount of lost motion in accordance with the tested position of the work.

18. In a heel-attaching machine, a support for a work piece comprising parts which are to be secured together and one of which is mounted upon a form, means for measuring a dimension of the form, a drill, power-operated means for causing the drill to form registering holes in said parts of the work piece, a driver, power-operated means for causing the driver to insert a screw in said holes, and means responsive to movement of said measuring means for varying the amount of movement of the drill and the driver in accordance with the setting of said form-measuring means.

19. In a fastening-inserting machine, means for clamping a work piece comprising two or more parts one of which is mounted upon a form, means for measuring a dimension of the form, said form being one of a graduated series of forms of different sizes for receiving parts of different sizes, a drill for forming holes in parts of the work piece, fastening-inserting means for securing said parts of the work piece together, and power-operated means for moving said drill and said fastening-inserting means predetermined but variable distances in accordance with the measured dimension of the form.

20. In a heel-attaching machine, a support for a shoe to the heel seat of which a heel is clamped, a drilling station comprising a drill and power-operated means for reciprocating the drill to form a hole extending through the heel seat of the shoe and into the heel, a fastening-inserting station comprising a driver and power-operated means for driving a fastening into said hole, and power-operated mechanism operative during a single uninterrupted cycle of the machine in timed relation with the drill and driver-operating means for causing the work mounted upon the support to be moved from an operative position adjacent to the drilling unit to an operative position adjacent to the fastening-inserting unit and back again.

21. In a heel-attaching machine, a power-operated drill for forming a hole extending through the heel seat of a shoe and into a heel clamped to said heel seat, a power-operated fastening-inserting driver for driving a fastening into the hole, and a power-operated work-supporting and clamping member movable in timed relation with said drill and said driver during a single uninterrupted cycle of the machine from drilling to fastening-inserting position and back again.

22. In a heel-attaching machine, a support for a shoe which is mounted upon a last and to the heel seat of which a heel is clamped, a drilling station comprising a rotatable drill reciprocable under power for forming a hole extending through the heel seat of the shoe and into the heel, a fastening-inserting station comprising a rotatable driver reciprocable under power for driving a screw into said hole, means for regulating the extent of reciprocatory movement of the drill and the driver in accordance with the measured height of the cone of the last, and means for moving the support to cause the work to be moved from drilling to fastening-inserting station and back again.

23. The combination with a jack for supporting a shoe which is mounted upon a last and has a passage extending heightwise through its cone, of a shoe-position-testing tube shaped and arranged for reception in said passage of the last, a tool movable through said tube, and means governed by said member for controlling the amount of movement of the tool.

24. The combination with a support for a work piece, of a pair of tools, means for moving the support to predetermined positions successively to locate the work piece in positions to be operated upon by said tools, a member for testing the position of the work piece upon the support, and means governed by the member for controlling movement of the tools.

25. In a heel-attaching machine, a support for a shoe mounted upon a last which has a passage extending heightwise through its cone, a position-testing member movable through the passage of the last, a pair of tools, means for moving the support in order to move the shoe successively into positions in which it may be operated upon by the tools respectively, and means governed by said testing member for controlling the amount of movement of said tools.

26. In a machine for operating upon shoes, a support for a shoe, a drill and a screw driver for operating upon the shoe, means for moving the support to predetermined positions alternately to locate the shoe in positions to be operated upon by the drill and the screw driver respectively, a member movable to test the position of the shoe, and means governed by said member for varying the amount of motion of the drill and the screw driver.

27. The combination with a movable support for work, of a movable tool for operating upon said work, a feeler for testing the position of said work, means operatively connected to and governed by said feeler for controlling the amount of movement of said tool, and mechanism for temporarily disconnecting the feeler from said means to permit the feeler to be moved with relation to said means preparatory to moving the support.

28. In a heel-attaching machine, a movable support for a shoe, a movable tool for operating upon the shoe, a feeler for testing the position of said shoe, means governed by the feeler for controlling the amount of movement of said tool, mechanism for securing the feeler in a predetermined position with relation to said means, and mechanism for releasing the feeler for independent movement with relation to said means.

29. In a heel-attaching machine, a movable support for work, a fixed frame upon which the support is mounted, a movable tool for operating upon said work, a feeler movable through registering openings in the support and the frame into a position above a work-supporting face of the support, means operatively connected to and governed by the feeler for varying the amount of movement of the tool, and mechanism for temporarily disconnecting the feeler from said means in order that the feeler may be moved out of said support opening preparatory to moving said support with relation to the frame.

30. In a heel-attaching machine, a movable support for work, a fixed frame upon which the support is mounted, a combined last pin and feeler tube movable in registering openings in the support and the frame to test the position of said work, a tool movable through the feeler tube to operate upon the work, means operatively connected to and governed by the feeler for causing the amount of movement of the tool to be varied in accordance with the tested position of the work, and mechanism for temporarily disconnecting the feeler from said means in order to enable the feeler to be moved with relation to said means preparatory to moving said support.

31. In a heel-attaching machine, a movable support for work, a fixed frame upon which the support is mounted, a combined last pin and feeler tube movable in registering openings in the support and the frame into a position above a work-supporting face of the support, a drill, a screw driver, mechanism for moving the drill through the feeler tube to form a hole in the work, mechanism for moving said driver to cause a screw to be driven into said hole, means operatively connected to and set by the feeler tube for varying the amount of movement of the drill and the screw driver in accordance with the position of the feeler tube, and mechanism for temporarily disconnecting the feeler tube from said means in order to enable the support to be moved without disturbing the setting of said means.

32. The combination with a support for a shoe upon a last having a passage, of a movable tool for operating upon the shoe, a combined last pin and shoe-position-testing member movable in the support and in the passage of the last, and means governed by the member for controlling the amount of movement of the tool.

33. In a machine for operating upon shoes, a jack for supporting a shoe mounted upon a last having a passage, a combined last pin and shoe-position-testing member movable in the support and in said passage of the last, a tool movable in said member, and means governed by said member for controlling the amount of movement of the tool.

34. The combination with a support for a shoe upon a last having a passage, of a movable combined last pin and shoe-position-testing member extending through the support, a spring for causing said member to extend above a last-engaging surface of the support when the machine is idle, said member being yieldable against the action of said spring under pressure of the shoe until the last upon which the shoe is mounted engages said surface, a movable tool for operating upon the shoe, and means governed by said member for controlling the amount of movement of the tool.

35. In a heel-attaching machine, a support for a shoe mounted upon a last having a passage, a combined last pin and tube for testing the position of the shoe, said tube being movable under pressure of the shoe into different testing positions above a last-engaging face of the support, a tool movable through said tube to operate upon the shoe, and means governed by said tube for controlling the amount of movement of the tool.

36. In a heel-attaching machine, a support for a shoe mounted upon a last having a passage which extends heightwise through its cone and terminates at a heel plate of the last, means comprising a yieldably supported combined last pin and tube extending above a last-engaging surface of the support and constructed and arranged to measure the cone of the last heightwise, a tool movable through the tube to operate upon the heel seat of the shoe and upon a heel clamped to said shoe, and means governed by said combined last pin and tube for controlling the amount of movement of the tool.

37. In a heel-attaching machine, a work support, a rotary screw driver, a nonrotatable screw-guiding member, and means for reciprocating the screw driver together with and relatively to said member.

38. In a heel-attaching machine, a work support, a driver for a screw, a movable screw-guiding member in which the screw to be driven is housed, and means for reciprocating the driver together with and relatively to said member.

39. In a heel-attaching machine, a work support, a driver for a screw, a screw-guiding sleeve which surrounds the driver and has a bore for receiving the screw, and means for reciprocating the driver together with and relatively to the sleeve.

40. In a heel-attaching machine, means for clamping a heel to the heel seat of a shoe, a rotary and reciprocatory screw driver, means for operating said driver to drive a screw through the heel seat of the shoe and into the heel, and a non-rotatable member which is constructed and arranged to receive the screw and is reciprocable together with the driver, said member being constructed and arranged to be stopped at a predetermined position during the reciprocation of the driver and serving as a guide for the head of the screw as said screw is being driven into the work by said driver.

41. In a heel-attaching machine, means comprising a support for clamping a heel to the heel seat of a shoe, a screw driver, means for operating said driver to drive a screw through the heel seat of the shoe and into the heel, and a member which is constructed and arranged to receive the screw and is movable together with the driver, said member being constructed and arranged to be stopped at a predetermined position during movement of the driver and serving as a guide in which the head of the screw slides as said screw is being driven into the work by said driver.

42. In a heel-attaching machine, a work support, a driver mounted for rotation and reciprocation, a nonrotatable sleeve mounted upon and yieldingly movable reciprocatingly upon the driver, and means for moving the sleeve to a predetermined position adjacent to work mounted upon the support and for then moving the driver relatively to the sleeve to insert a fastening in the work.

43. In a machine for operating upon shoes, means comprising a support for clamping two shoe parts together, a driver guide, a screw driver movable in said guide, and means for moving said guide and said driver together until the guide engages a portion of one of said shoe parts and for thereafter moving the driver to drive a screw, which is housed in said guide and the head of which is oriented by said guide, into said shoe parts.

44. In a heel-attaching machine, a work support, a sleeve mounted for sliding movement in said support, a screw driver slidable together with and in said sleeve, yieldable means for maintaining the sleeve in a predetermined operative position upon the driver, in which position the driver and the sleeve form a screw-receiving recess, and means for operating the driver first to cause the sleeve and the driver to move together in order to transfer a screw housed in said recess into approximate contact with work upon the support and then to move the driver relatively to the sleeve to force the screw into the work.

45. In a heel-attaching machine, a support for a shoe mounted upon a last, said last being provided with a heel plate and having a passage extending heightwise through its cone, a hole formed in the support, a driver guide having a bore, means for moving the driver guide through the hole in the support and into the passage of the last until said guide has been moved into engagement with the heel plate of the last, a driver, and means for moving the driver in the driver guide to force said screw, the head of which is maintained in its proper position in the bore of said guide, through the heel seat of the shoe and into a heel secured to said heel seat.

46. In a fastening-inserting machine, a support, means for clamping parts of a work piece to the support, and associated mechanism for driving a screw into said parts, said mechanism comprising a driver, means for positively reciprocating the driver variable distances in accordance with the position of a face of one of the parts of said work piece to insert said screw into the parts of the work piece until its head is flush with said face, and means for positively rotating said driver a fixed number of revolutions after the pointed end of the screw has been moved into alinement with said face.

47. In a fastening-inserting machine, a support, means for clamping parts of a work piece to the support, and associated mechanism for driving a screw into said parts, said mechanism comprising a driver mounted for rotation and reciprocation, positive means for reciprocating the driver at such a speed that the axial advance of the screw caused by its rotation is substantially equal to the axial advance of the driver, and means for simultaneously limiting the advance of the driver and causing its rotation to cease.

48. In a fastening-inserting machine, a support, means for clamping parts of a work piece to the support, and associated mechanism for driving a screw into said parts, said mechanism comprising a driver mounted for reciprocation and rotation, cam-controlled means for causing the driver to rotate at a predetermined time during its reciprocation, and means for reciprocating the driver at such a speed that the axial advance of the screw caused by its rotation is substantially equal to the axial advance of the driver.

49. In a heel-attaching machine, a support for a shoe mounted upon a last, screw-guiding and inserting mechanism, said mechanism comprising a screw driver, a sleeve in which the driver is mounted for movement, yieldable connections between the sleeve and the driver, said connections being constructed and arranged when the machine is idle to cause the screw-engaging end of the driver to be housed in said sleeve and to form with the sleeve a recess shaped and arranged to receive a screw, and means for operating the driver first to cause an end of the sleeve to engage the last and then to move the driver a predetermined distance with relation to the sleeve to drive the screw into the heel seat of the shoe and into a heel clamped to the shoe.

50. In a heel-attaching machine, a support for a shoe, screw-guiding and inserting mechanism, said mechanism comprising a screw driver, a sleeve in which the driver is mounted for movement, yieldable connections for normally causing the screw-engaging end of the driver to be moved to a position located at a substantial distance from an end of the sleeve, and means for operating the driver in order to cause said end of the sleeve first to engage a heel plate of a last upon which the shoe is mounted and then to cause the driver to move relatively to the sleeve to drive a screw through the heel seat of the shoe and into a heel clamped to said heel seat.

51. In a heel-attaching machine, a support for a last upon which a shoe is mounted, said support having an opening and said last having a passage which extends heightwise through its cone and which is brought into registration with the opening in the support, a sleeve, means for moving the sleeve through said opening and to a predetermined position in the passage of the last, a screw driver, means for reciprocating the screw driver in the sleeve, and cam-operated means effective to rotate and to stop rotation of the screw driver at predetermined times during its reciprocation.

52. In a heel-attaching machine, a support for a last upon which a shoe is mounted and which has a passage extending through its cone, a screw driver, means for effecting relative translatory movement between the support and the driver to insert a screw upon the driver through the heel seat of the shoe and into a heel clamped to said heel seat, and cam-operated means for starting rotation of the screw during said translatory movement when the point of the screw has been moved into substantial alinement with the heel portion of the insole of the shoe.

53. In a heel-attaching machine, a support for a last upon which a shoe is mounted and which has a passage extending through its cone, a yieldably supported tube which extends above the support and is constructed and arranged to be received in said passage to facilitate the positioning of the shoe upon the support, and a tool movable through the tube to operate upon the shoe.

54. In a heel-attaching machine, a support for a last upon which a shoe is mounted, said last having a passage extending heightwise through its cone, a tube which normally projects above the support and is yieldably supported to facilitate the positioning of the shoe upon the support, a clamp for forcing a heel against the heel seat of the shoe and the last against the support, and a drill movable through the tube to form a hole in the heel seat of the shoe and the heel.

55. In a heel-attaching machine, a support for a last which has a passage extending heightwise through its cone and upon which a shoe is mounted, a spindle which projects above the support and facilitates the positioning of the shoe and the last upon the support, said spindle being yieldingly supported, and a clamp constructed and arranged to force a heel against the heel seat of the shoe and the crown of the last against the support.

56. In a heel-attaching machine, a support for a shoe, opposite clamps, an actuating member which is mounted for reciprocation and also for swinging movement as a fulcrum lever about an axis arranged transversely to said direction of reciprocation, means responsive to reciprocative movement of said member for causing the clamps to move quickly into engagement with a heel positioned upon the shoe, and means responsive to swinging movement of said member for causing the clamps to force the heel with considerable pressure against the shoe.

57. In a heel-attaching machine, a support for a shoe, opposite heel clamps, a manually operative actuating member mounted for sliding and pivotal movement, means responsive to sliding movement of said member for causing the clamps to swing from an inoperative position above and rearward of a heel positioned upon the shoe to a position below the heel and then to move heightwise of and into engagement with the heel, and means responsive to pivotal movement of said actuating member for causing the clamps to force the heel against the heel seat of the shoe with final clamping pressure.

58. In a heel-attaching machine, a support for a shoe, a clamp, a block and pinion pivotally mounted upon the support, means for operatively connecting the pinion and the clamp, a manually operative member slidable in the block and having a rack meshing with the pinion, the arrangement being such that sliding movement of the member causes the clamp to be forced with initial pressure against a heel positioned upon the shoe mounted upon the support, and means comprising said rack for causing rotation of said actuating member in the block to bind together said member, the block and the pinion whereby the manually operated member serves as a lever swinging movement of which causes the heel to be forced with considerable pressure against the shoe.

59. In a heel-attaching machine, a shoe support having a guideway, a carrier slide movable in said guideway, a work clamp operatively connected to the carrier slide, a rotatable shaft mounted in the support, a block normally pivoted upon the shaft and having a guideway, a manually operative lever slidable in the guideway of the block, one or more members secured to the shaft and responsive to movement of said lever, the arrangement being such that sliding movement of the lever in the guideway of the block operates the carrier slide in the guideway of the support, and means for locking said lever to one of said members thereby to cause rotative movement of the lever together with the block about the axis of the shaft to operate the carrier slide in the guideway of the support.

60. In a heel-attaching machine, a support for a shoe, said support having a guideway, a clamp-operating slide which is movable in said guideway and has a rack, a shaft rotatably mounted in the support, a gear which is secured to the shaft and meshes with the rack on the clamp-operating slide, a block which is pivoted on the shaft and has a guideway, a manually operative lever which is slidable in the guideway of the block and has a rack, a gear secured to the shaft and meshing with the rack of said lever, the arrangement being such that sliding movement of the lever in the block causes the clamp-operating slide to move along its guideway, and means for locking the manually operative lever to the second-named gear whereby swinging movement of the lever together with the block about the axis of the shaft causes said slide to move in its guideway.

61. In a heel-attaching machine, a work support having a guideway, a shaft rotatably mounted in the support, a slide movable in the guideway of the support, means for operatively connecting the shaft to the slide, clamping means movable in response to movement of the slide, a manually operative member, means for causing translatory movement of said member to rotate the shaft, and means for causing said member to be locked with relation to the shaft in order that swinging movement of the member shall rotate said shaft.

62. In a heel-attaching machine, a support for a shoe, a slide movable in said support, a heel clamp pivoted on said slide, means for effecting translatory movement of said clamp together with said slide, and means for causing the clamp to move with relation to said slide.

63. In a heel-attaching machine, a support for a shoe, a heel clamp, a carrier comprising a supporting portion slidingly mounted in the support and a supported portion to which the heel clamp is secured and which is movable together with the supporting portion and is also mounted for tilting movement with relation to the supporting portion, and means constructed and arranged to move both portions of the carrier heightwise of the shoe mounted upon the support while maintaining the portions in the same position relatively to each other and then to tilt the supported portion relative to the supporting portion.

64. In a heel-attaching machine, a support for a shoe upon a last, a feeler movable through the heel seat of the shoe and against the heel seat of the last to determine the location of the heel seat of the last, a tool for operating upon the supported shoe, and means governed by the feeler for controlling movement of said tool.

65. In a heel-attaching machine, a support for a shoe upon a last, a feeler, means for moving the feeler through the heel seat of the shoe and into engagement with the outside face of a heel plate of the last, means for attaching a heel to the shoe, and means governed by the feeler for controlling movement of said heel-attaching means.

66. In a heel-attaching machine, a support for a shoe upon a last, a feeler movable against a heel plate of the last and constructed and arranged to force the last against the support, one or more movable tools for operating upon the shoe, and means governed by the feeler for controlling the amount of movement of said one or more tools.

67. In a heel-attaching machine, a support for a shoe upon a last, a tool for operating upon the shoe, a feeler mounted for swinging movement from an idle position at one side of the shoe to an operative position opposite the heel seat of the shoe, means for moving the feeler through the heel seat of the shoe and against a heel plate of the last, a member responsive to movement of the feeler, and means for moving the tool different distances in accordance with different settings of the member.

68. In a heel-attaching machine, means for supporting a shoe upon a last, a drill for operating upon the shoe, a feeler movable through the heel seat of the shoe into engagement with the heel seat of the last, and means governed by said feeler for controlling the length of stroke of the drill.

69. In a heel-attaching machine, a support for a shoe upon a last, a feeler movable through the heel seat of the shoe and into engagement with the last, a movable fastening-inserting driver, and means governed by the feeler for controlling the extent of movement of the driver.

70. In a heel-attaching machine, a work support, a pair of tools, a support movable to present the work successively into positions to be operated upon by said tools, a feeler for testing the position of the work upon the support, and automatic means governed by the feeler for controlling the amount of movement of the tools.

71. In a fastening-inserting machine, a support for a shoe mounted upon a last, means movable into engagement with the heel seat of the last for measuring the cone of said last heightwise, fastening-inserting means movable through the last for attaching a heel to the shoe, mechanism for actuating said fastening-inserting means, and means for introducing into the movement of said mechanism a variable amount of lost motion in accordance with the measured height of the cone of the last.

72. In a heel-attaching machine, a support for a shoe mounted upon a last which has a passage extending heightwise through its cone, an awl, mechanism for causing the awl to pierce the heel seat of the shoe and to move into engagement with the heel seat of the last thereby measuring the cone of the last heightwise, a mask set by said mechanism, means for clamping a heel against the heel seat of the shoe and the last against the support, a tool for driving a fastening through the heel seat of the shoe and into the heel, and means controlled by the mask for causing the tool to drive the fastening through said last passage and flush with the inside face of the heel end of the insole of the shoe irrespective of the height of the cone of the last.

73. In a heel-attaching machine, a work support, a pair of tools, means for operating the support to move the work alternately into positions to be operated upon by said tools, a feeler for testing the position of the work upon the support, and means governed by the feeler for controlling the amount of movement of the tools, said feeler being movable with relation to said last-named means.

74. In a heel-attaching machine, a support for a shoe mounted upon a last, a position-testing member constructed and arranged to penetrate the heel seat of a shoe and to be moved against the heel seat of the last, a pair of tools, means for moving the support to move the shoe alternately into positions to be operated upon by said tools, and means governed by said testing member for controlling the amount of movement of the tools, said position-testing member being movable with relation to the last-named means.

75. In a heel-attaching machine, a support for a shoe mounted upon a last, mechanism comprising an awl movable through the heel seat of the shoe and against the heel seat of the last, a pair of tools, means for moving the support into different positions in which the shoe may be operated upon successively by said tools, and means governed by said mechanism for varying the amount of movement of each of the tools, said awl being movable with relation to said last-named means.

76. In a heel-attaching machine, a support for a shoe mounted upon a last, a drill and a screw driver for operating upon the shoe, means for operating the support in order to move the shoe successively to predetermined positions adjacent to the drill and to the screw driver respectively, mechanism comprising an awl movable through the heel seat of the shoe and into engagement with the heel seat of the last, and means governed by said mechanism for controlling the amount of movement of the drill and the screw driver, said awl being movable with relation to said last-named means.

77. In a heel-attaching machine, a support for a shoe upon a last having a passage, a tubular last pin, a tool movable through said last pin and through said passage in the last to operate upon the shoe, a feeler movable through the heel heat of the shoe and against the heel seat of the last, and means governed by said feeler for controlling the amount of movement of the tool, said feeler being movable with relation to said means in order to move the feeler from a last-measuring position to an inoperative position away from said last while retaining said means in its operative position.

78. In a fastening inserting machine, a support, means for clamping a heel to the heel seat of a shoe mounted upon a last and for clamping the last to the support, mechanism for driving a screw through the heel seat of the shoe and into the heel, said mechanism comprising a screw driver mounted for rotation and reciprocation, a feeler movable through the heel seat of the shoe and against the heel seat of the last, and means governed by the feeler for controlling the amount of reciprocation of said mechanism, said mechanism being constructed and arranged to cause the rate of reciprocation of the driver to be equal to the rotative speed of the driver times the pitch of a screw being driven.

79. In a heel-attaching machine, a feeler for testing the position of the heel seat of a shoe mounted upon a last, a movable tool for operating upon the shoe, a manually operated slide, means responsive to movement of the slide for varying the amount of movement of the tool in accordance with the position of the feeler, said feeler comprising the slide, an arm, an awl carried by said arm, and means for causing reciprocatory movement of said slide to impart simultaneous rotary and reciprocative movement to said arm.

80. In a heel-attaching machine, a feeler for testing the position of the heel seat of a shoe mounted upon a last, a movable tool for operating upon the shoe, a manually operated slide, means responsive to movement of the slide for varying the amount of movement of the tool in accordance with the position of the feeler, said feeler comprising the slide, an arm, an awl carried by said arm, means for causing reciprocatory movement of said slide to impart simultaneous rotary and reciprocative movement to said arm, and means for securing the awl in different positions upon said arm.

81. In a heel-attaching machine, a feeler for testing the position of the heel-seat portion of a shoe mounted upon a last, a movable tool for operating upon the shoe, resilient means for holding the feeler in an inactive position away from the shoe, manually operated means for causing the feeler to be moved against the action of said resilient means into engagement with the heel seat of the last, and mechanism responsive to movement of the feeler for varying the amount of movement of the tool in accordance with the setting of said feeler.

JOHN T. LANCASTER.